(12) United States Patent
Brewer et al.

(10) Patent No.: US 7,116,666 B2
(45) Date of Patent: *Oct. 3, 2006

(54) SWITCH ASSISTED FRAME ALIASING FOR STORAGE VIRTUALIZATION

(75) Inventors: Lani William Brewer, Anaheim, CA (US); John Gifford Logan, Newport Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/037,197

(22) Filed: Jan. 19, 2005

(65) Prior Publication Data

US 2005/0125418 A1 Jun. 9, 2005

Related U.S. Application Data

(63) Continuation of application No. 09/881,949, filed on Jun. 15, 2001, now Pat. No. 6,876,656.

(51) Int. Cl.
*H04L 12/56* (2006.01)
*H04L 12/54* (2006.01)
*G06F 15/16* (2006.01)

(52) U.S. Cl. ............ 370/392; 370/465; 370/229; 370/233; 370/389; 709/203; 709/219

(58) Field of Classification Search ........ 370/351–352, 370/392, 401, 465, 229–230, 235–237, 389; 709/213, 201, 203, 219
See application file for complete search history.

(56) References Cited

U.S. PATENT DOCUMENTS

| | | | |
|---|---|---|---|
| 5,590,379 A | 12/1996 | Hassler et al. |
| 5,933,580 A | 8/1999 | Uda et al. |
| 6,222,837 B1 | 4/2001 | Ahuja et al. |
| 6,535,518 B1 | 3/2003 | Hu et al. |

*Primary Examiner*—Chi Pham
*Assistant Examiner*—Ronald Abelson
(74) *Attorney, Agent, or Firm*—Squire, Sanders & Dempsey L.L.P.

(57) ABSTRACT

An apparatus and process for relabelling and redirecting at least some of the read transaction data frames and the write transaction write data and transfer ready frames in a network so as to bypass a storage manager and pass directly between the client and a storage device via a switch. This eliminates the storage manager as a bottleneck. Some embodiments redirect every read and write transaction, and others redirect only large transactions, or only ones not stored in cache or when latency gets too high. Redirection is accomplished by transmission from the storage manager to a switch redirection commands that contain old and new address data. When a frame to be redirected comes in, its address is compared to the old address data. If there is a match, the new address data is substituted and the frame is passed to a conventional routing process to be routed so as to bypass the storage manager.

42 Claims, 20 Drawing Sheets

SWITCH ALIASED READ TRANSACTION PROCESS FOR REDIRECTING
DATA AND TRANSFER READY FRAMES

| SWITCH | STORAGE DEVICE | STORAGE MANAGER | CLIENT DEVICE |
|---|---|---|---|
| | | (1) STORAGE MANAGER IS CONFIGURED TO KNOW SWITCH PORTS IN CLIENT AND STORAGE PATHS (EXCEPT IN EMBODIMENTS WHERE EVERY PORT OF THE SWITCH STORES EVERY REDIRECTION COMMAND) | |
| | | | (2) READ COMMAND SENT FROM CLIENT (HOST) TO STORAGE MANAGER FOR SCSI BLOCKS 7-11. ORIGINATOR EXCHANGE ID IS ESTABLISHED BY HOST |
| | | (3) STORAGE MANAGER MAPS ORIGINAL REQUEST TO STORAGE DEVICE NUMBER AND BLOCKS ON THAT DEVICE AND DETERMINES FROM WHICH CLIENT THE REQUEST CAME | |
| | | (4) MANAGER SENDS AT LEAST A SECOND REDIRECTION COMMAND (FOR RESPONDER FRAMES ONLY) TO THE SWITCH CENTRALIZED REDIRECTION PROCESS OR, AT LEAST TO THE REDIRECTION PROCESSES IN THE PORTS THAT WILL BE REQUIRED TO MAKE A CONNECTION BETWEEN THE STORAGE DEVICE DETERMINED IN STEP (3) AND THE CLIENT THAT SENT THE REQUEST. THE APPROPRIATE REDIRECTION PROCESS(ES) THEN STORE THE REDIRECTION COMMANDS IN CENTRALIZED LOOKUP TABLE OR IN AT LEAST THE LOOKUP TABLES OF THE INVOLVED PORTS. THE SECOND REDIRECTION COMMAND HAS "OLD ADDRESS DATA" THAT IS USED TO RECOGNIZE FRAMES TO BE REDIRECTED, AND HAS "NEW ADDRESS DATA" THAT IS USED TO RELABEL THE FRAMES | |

FIG. 2A

SWITCH ALIASED READ TRANSACTION PROCESS FOR REDIRECTING
DATA AND TRANSFER READY FRAMES

| | | | | |
|---|---|---|---|---|
| | | TO BE REDIRECTED. | | |
| | | (5) MANAGER SENDS READ COMMAND TO STORAGE DEVICE DETERMINED IN STEP (3). USE ANY ORIGINATOR EXCHANGE ID ASSIGNED BY THE MANAGER | | |
| | (6) STORAGE DEVICE SENDS REQUESTED DATA BACK IN FRAMES ADDRESSED TO STORAGE MANAGER USING THE ORIGINATOR EXCHANGE ID ASSIGNED BY STORAGE MANAGER AND ASSIGNS ANY RESPONDER ID | | | |
| (7) SWITCH PORT RECOGNIZES THE FRAMES ADDRESSED TO STORAGE MANAGER BY THE ORIGINATOR EXCHANGED ID, SOURCE AND DESTINATION ADDRESS AND, IF THE FRAMES ARE RESPONDER FRAMES AND ARE DATA OR TRANSFER READY FRAMES, THE REDIRECTION PROCESS IN THE SWITCH RELABELS THEM WITH THE "NEW ADDRESS DATA" TO REDIRECT THE RELABELLED FRAMES DIRECTLY TO THE CLIENT DEVICE WHICH REQUESTED THE DATA AND TO MAKE THEM LOOK AS IF THEY CAME FROM THE STORAGE MANAGER | | | | |

FIG. 2B

SWITCH ALIASED READ TRANSACTION PROCESS FOR REDIRECTING
DATA AND TRANSFER READY FRAMES

| | | | |
|---|---|---|---|
| (8) SWITCH DETERMINES FROM NEW DESTINATION ADDRESS WHICH PORT TO FORWARD FRAME TO AND MAKES THE APPROPRIATE CONNECTIONS TO FORWARD THE FRAME TO THE PORT COUPLED TO THE CLIENT DEVICE THAT REQUESTED THE DATA | | | |
| | | | (9) CLIENT DEVICE RECEIVES FRAME OR FRAMES AND GIVES THE DATA TO WHATEVER PROCESS IN THE CLIENT REQUESTED THE DATA. |
| | (10) STORAGE DEVICE SENDS GOOD STATUS FRAME TO STORAGE MANAGER | | |
| (11) REDIRECTION PROCESS IN SWITCH PORT OR CENTRALIZED REDIRECTION CIRCUITRY READS HEADER TYPE OF FRAME AND DETERMINES THAT THE STATUS FRAME IS NOT DATA AND DOES NO HEADER MODIFICATION AND ROUTES STATUS FRAME TO STORAGE MANAGER. IN THE PREFERRED EMBODIMENT, THE SWITCH ALSO | | | |

FIG. 2C

SWITCH ALIASED READ TRANSACTION PROCESS FOR REDIRECTING DATA AND TRANSFER READY FRAMES

| | | | |
|---|---|---|---|
| AUTOMATICALLY PURGES ALL REDIRECTION COMMANDS ASSOCIATED WITH THE TRANSACTION TO WHICH THE STATUS FRAME APPLIES | | | |
| | | (12) STORAGE MANAGER SENDS GOOD STATUS FRAME HEADER TO THE REQUESTING CLIENT. THE STORAGE MANAGER, IN ALTERNATIVE EMBODIMENTS WHERE THE SWITCH DOES NOT AUTOMATICALLY PURGE, THE STORAGE MANAGER ALSO SENDS A PURGE COMMAND TO THE SWITCH IDENTIFYING WHICH REDIRECTION COMMANDS NEED TO BE PURGED FROM THE LOOKUP TABLES | |
| (13) IN THE ALTERNATIVE EMBODIMENTS, THE SWITCH RECEIVES THE PURGE COMMAND FROM THE STORAGE MANAGER AND PURGES THE IDENTIFIED REDIRECTION COMMANDS FROM THE APPROPRIATE LOOKUP TABLE(S) | | | |
| | | | |

FIG. 2D

SWITCH ALIASED WRITE TRANSACTION TO REDIRECT EVERY
DATA AND TRANSFER READY FRAME

| SWITCH | STORAGE DEVICE | STORAGE MANAGER | CLIENT DEVICE |
|---|---|---|---|
|  |  | (1) CONFIGURATION DATA OR DISCOVERY PROCESS DETERMINES WHICH DEVICES ARE COUPLED TO WHICH PORTS (OMIT THIS STEP IN BROADCAST OR CENTRALIZED EMBODIMENTS) |  |
|  |  |  | (2) CLIENT SENDS WRITE COMMAND TO STORAGE MANAGER |
|  |  | (3) STORAGE MANAGER COMPUTES MAPPING TO DETERMINE WHERE DATA TO BE WRITTEN IS TO BE STORED. THEN TWO REDIRECTION COMMANDS ARE WRITTEN AND SENT TO THE SWITCH FOR STORAGE IN AT LEAST ONE LOOKUP TABLE |  |
|  |  | (4) STORAGE MANAGER SENDS A WRITE COMMAND TO THE STORAGE DEVICE AND ASSIGNS AN ORIGINATOR EXCHANGE ID |  |
|  | (5) STORAGE DEVICE SENDS A TRANSFER READY FRAME TOWARD THE STORAGE MANAGER. |  |  |
| (6) SWITCH RECOGNIZES TRANSFER READY FRAMES AND RECOGNIZES THE FRAME AS A RESPONDER FRAME, AND GENERATES A SEARCH KEY FROM |  |  |  |

FIG. 4A

SWITCH ALIASED WRITE TRANSACTION TO REDIRECT EVERY DATA AND TRANSFER READY FRAME

| | | | |
|---|---|---|---|
| THE TRANSFER READY FRAME HEADER DATA, AND FINDS A MATCH BETWEEN THE SEARCH KEY DATA AND OLD ADDRESS DATA OF A SECOND REDIRECTION COMMAND. THE SWITCH THEN COPIES THE RESPONDER EXCHANGE ID FROM THE TRANSFER READY FRAME AND WRITES IT TO THE NEW ADDRESS DATA OF THE ASSOCIATED FIRST REDIRECTION COMMAND. THE RELABELLING PROCESS OF THE SWITCH PORT THEN USES NEW ADDRESS DATA FROM THE MATCHING SECOND REDIRECTION COMMAND TO RELABEL THE FRAME AND TOWARDS THE RELABELLED FRAME TO THE SWITCH ROUTING PROCESS FOR REDIRECTION TO CLIENT THEREBY BYPASSING STORAGE MANAGER | | | |
| | | | (7) CLIENT RECEIVES EACH TRANSFER READY FRAME AND RESPONDS BY TRANSMITTING A FRAME OF WRITE DATA TOWARD THE STORAGE MANAGER |
| (8) SWITCH RECEIVES DATA FRAME(S) AND RECOGNIZES EACH AS A ORIGINATOR DATA FRAME. | | | |

FIG. 4B

SWITCH ALIASED WRITE TRANSACTION TO REDIRECT EVERY
DATA AND TRANSFER READY FRAME

| SWITCH CREATES A SEARCH KEY FROM THE HEADER DATA OF EACH DATA FRAME AND USES SEARCH KEY (TYPICALLY THE DESTINATION ADDRESS AND THE RESPONDER EXCHANGE ID) TO SEARCH OLD ADDRESS DATA OF ACTIVE FIRST REDIRECTION COMMANDS IN LOOK UP TABLE(S) OF SWITCH. IF A MATCH IS FOUND, THE FRAME IS RELABELLED USING THE NEW ADDRESS DATA FROM THE MATCHING FIRST REDIRECTION COMMAND, AND THE RELABELLED FRAME IS PASSED TO THE ROUTING PROCESS | | | |
|---|---|---|---|
| | (9) STORAGE DEVICE RECEIVES THE DATA FRAME AND STORES IT. IF THE AMOUNT OF DATA TO BE WRITTEN IS MORE THAN ONE FRAME, STORAGE DEVICE REPEATS STEP (5) AS MANY TIMES AS NECESSARY TO GET ALL THE DATA STORED | | |
| (10) SWITCH REPEATS STEPS (5) AND (8) AS MANY TIMES AS NECESSARY TO GET ALL THE DATA STORED | | | |
| | | | (11) CLIENT DEVICE REPEATS STEP (6) AS MANY TIMES AS NECESSARY TO GET |

FIG. 4C

SWITCH ALIASED WRITE TRANSACTION TO REDIRECT EVERY
DATA AND TRANSFER READY FRAME

| | | | ALL THE DATA STORED. |
|---|---|---|---|
| | (12) STORAGE DEVICE SENDS DONE STATUS TO THE STORAGE MANAGER WHEN THE LAST DATA FRAME HAS BEEN RECEIVED AND STORED WITH NO ERRORS | | |
| (13) SWITCH DOES NOT REDIRECT THE STATUS FRAME AND FORWARDS IT TO STORAGE MANAGER. IN THE PREFERRED EMBODIMENT, THE SWITCH AUTOMATICALLY PURGES THE FIRST AND SECOND REDIRECTION COMMANDS THAT PERTAIN TO THE TRANSACTION JUST COMPLETED. | | | |
| | | (14) STORAGE MANAGER RECEIVES DONE STATUS FRAME AND FORWARDS IT TO THE CLIENT DEVICE. IN ALTERNATIVE EMBODIMENTS WHERE THE SWITCH DOES NOT AUTOMATICALLY PURGE, STORAGE MANAGER ALSO SENDS PURGE COMMANDS TO SWITCH TO PURGE THE TWO REDIRECTION COMMANDS THAT WERE ISSUED FOR THE WRITE TRANSACTION JUST COMPLETED | |
| (16) IN ALTERNATIVE EMBODIMENTS, THE | | | (15) CLIENT RECEIVES THE |

FIG. 4D

| SWITCH ALIASED WRITE TRANSACTION TO REDIRECT EVERY DATA AND TRANSFER READY FRAME | | | |
|---|---|---|---|
| SWITCH RECEIVES THE PURGE COMMAND FROM THE STORAGE MANAGER AND FINDS AND PURGES THE APPROPRIATE FIRST AND SECOND REDIRECTION COMMANDS. | | | STATUS FRAME |

FIG. 4E

SWITCH ASSISTED FRAME ALIASING FOR STORAGE VIRTUALIZATION

REFERENCE TO RELATED APPLICATIONS

This application is continuation of application Ser. No. 09/881,949, filed Jun. 15, 2001 now U.S. Pat. No. 6,876,656. The content of this patent application is hereby incorporated by reference.

BACKGROUND OF THE INVENTION

The invention finds application in data processing systems such as storage area networks which have at least: (1) an interconnect network which transports data in packets; (2) a storage client or clients; (3) a storage server; and (4) storage devices. In such networks the storage server manages a large number of storage devices to retrieve and store data for various storage clients. The storage clients are not directly connected to the storage devices, and request data stored on the storage devices by making requests to the storage server. The storage server then makes a request to the storage devices. The network, comprised of physical transmission medium and various devices such as hubs, switches, routers etc. provides for the actual transport of data between the clients and the storage manager in the storage server and the transport of data between the storage server and the storage devices. The network also provides a data path between the storage clients and the storage devices. Any connections between the storage clients and the storage devices are not used, because the storage server needs to be solely responsible for the organization of data on the storage devices.

FIG. 1 shows a typical prior art network configuration implemented with a switch. Storage clients 10 and 12 are coupled to two different ports of switch 14. The switch is also coupled to storage devices 16 and 18 through two different ports. A storage server 20 implementing a storage manager process has an input 22 coupled to one port and an output 24 coupled to another port. The switch allows each port to be coupled to any other port and allows multiple simultaneous connections. Thus, data paths between the clients and the server and between the server and the storage devices can be set up through the switch. In addition, data paths can be set up between the storage clients and the storage devices through the switch, but the clients have no use for this since the clients recognize only the server/storage manager as a storage provider even though the actual data is stored on the storeage devices.

The way a prior art network such as a Fibre Channel Network works to read and write data between client devices and storage devices was as follows. Referring to FIG. 1, a client 10 which wishes to retrieve data from the storage manager would address a Fibre Channel (FC) frame to the server 20 (all the prior art transport protocols and primitives will not be described as they not are part of the invention other than as the basic platform on which the invention sits). This frame contains a SCSI command requesting the desired data. The frame will have a header that contains address information and a payload which contains a SCSI command. The address (PA) of storage client will be the source address, and the address of the server will be the destination address. The header of each frame also contains two exchange IDs, one for the originator and one for the responder, that serves to identify all the frames that belong to this particular read or write transaction. If the same client has, for example, two read or write transaction outstanding, all the frames transmitted from that originator client pertaining to either of those transactions will have the same source and destination address, but all the frames pertaining to the first transaction will have a first originator exchange ID, and all the frames pertaining to the second transaction will have a second, different originator exchange ID. There are also flags to indicate the type of data contained in the payload section of the FC frame such as: a command to do a read or write, a transfer ready message or the requested data itself.

The sequence of events for write and read data transfer operations in a prior art network like that shown in FIG. 1 has the exchanges defined in Table 1 below. In the prior art data transfers, the originator would be a storage client and the responder would be the storage manager 20 for both read and write transactions.

TABLE 1

| DIRECTION | WRITE ORDER | READ ORDER |
| --- | --- | --- |
| (1) Originator to Responder | Command to write data | Command to read data |
| (2) Responder to Original | Transfer Ready | |
| (3) Responder to Originator | | Requested data transferred to originator from responder |
| (4) Originator to Responder | Data to be written transferred to responder | |
| (5) Responder to Originator | Status | Status |

The way this sequence of events works in the prior art networks is that the client 10 sends a SCSI command to, for example, read data to the storage manager. This request will be transmitted to the storage manager through the switch by encapsulating the SCSI command in a FC frame or other packet, as represented by line 1 of Table 1. The read command will request reading of data and specify the desired data by, for example, specifying that the desired data resides on SCSI Logical Unit 1, starting at logical block 75 and extends for 200 logical blocks. This read request will have as its destination address, the address of the storage manager server 20 (hereafter the storage manager or server), and will have an originator exchange ID assigned by the client 10 for this transaction, and the responder exchange ID will be blank.

The storage manager 20 contains a map of where client data is stored for all the data that is stored on the storage devices it is managing. The storage manager 20 looks up where the requested data is stored and establishes a connection through the switch with the storage device storing the requested data and retrieves the data by sending an FC frame encapsulating a command to read the requested data and send it back to the storage manager. FIG. 1 illustrates this sequence of events with the storage manager being the originator and the client being the responder. In this prior art mechanism, the storage manager is the originator of this transaction between itself and the storage device, so the storage manager fills in an originator exchange ID for the transaction which could be anything, but which serves to identify this transaction between the storage manager and the storage device. The responder exchange ID is left blank by the storage manager.

The requested data is read by the storage device and then transferred to and stored on the storage manager 20. In this transaction, the storage device generates an outgoing frame or frames with some responder exchange ID assigned by the storage device and fills in the outgoing frame or frames with data and the originator exchange ID used by the storage manager in the frame requesting the data.

After having received some of the frames and stored the data, the storage manager generates one or more FC frames in which the retrieved data is put, each said generated frame having a destination address which is the Port_ID of the client that made the original request and the Port_ID of the storage manager 20 as the source address. These frames will be filled in so as to have as the originator ID the original originator ID assigned by the client, and will have as the responder ID an ID assigned to the transaction by the storage manager for this read request. The storage manager 20 then sends the frame or frames with the requested data (or at least part of it) encapsulated as the payload in the FC frame or frames and the data flag set in the header, as symbolized by line 3 of Table 1 above. Then a status message is sent from the storage device to the storage manager indicating that all the data has been sent. The storage manager in turn sends a status frame to the client.

The actual processing inside the storage manager 20 during such a prior art exchange is as follows. The storage client 10, when it makes the original request, assigns to that request a particular originator exchange ID. It does this because it may make other concurrent requests for data from the storage manager, and when it gets a frame of data back, it needs to know to which request that data frame is a response. The request gets sent to the storage manager which then retrieves the data from the appropriate storage device using frames with an originator exchange ID assigned by the storage manager for this transaction with the storage device, and with the source ID equal the storage device's port ID and the destination ID set to the storage manager's port ID. When a frame of data comes back from the storage device, it has as its source address the storage device address (PA) and as its destination address the address of the storage manager 20 and it has the assigned originator exchange ID used by the storage manager and a responder exchange ID assigned by the storage device. An engine in the storage manager receives these frames and stores the data therefrom in memory until they can be framed for transmission to the client. Another engine in the storage manager then matches up the requests that are pending with the data that has been received. When it finds a match, the engine puts data in an FC frame or frames using the storage manager's Port_ID as the source address and the Port_ID of the client that made the request as the destination address and includes the appropriate exchange IDs so the client will know to which of its requests the data frame is a response. The frame is then sent to the client through the switch.

The memory in the storage manager has a bandwidth that is related to the bandwidth of the internal bus of the storage manager server. Fibre Channel bandwidth is very high. Assume that if a client were connected directly to a storage device through a switch, that data transfers of 100 Mbytes/sec could occur. Now suppose there were 10 clients in FIG. 1 simultaneously connected to 10 storage devices through switch 14 that could support 10 simultaneous connections. Now the effective data transfer rate is 10×100 Mbytes/sec or 1 Gigabyte/second. Now, if all that data must pass through a data storage manager, there would have to be a 1 Gigabyte/second data path to the memory in the storage manager server 20. Typically, these storage manager servers have PCI buses which do not have bandwidth even approaching 1 Gigabyte/second.

Obviously, the framing of the data in the, server for transfer to the client takes time and the storage manager bus bandwidth is a bottleneck in high volume traffic situations.

Furthermore, extensive memory is required in the storage manager server to store all the data before it is retransmitted and the operating system is kept busy organizing the data in memory and organizing the receiving and transmittal of frames. All this needlessly consumes computing resources.

Prior art attempts to solve this problem include the massively parallel storage managers made by EMC. These very expensive servers use parallel buses and parallel processors and complicated software to coordinate the operations thereof. Even they can be a bottleneck however.

There is an existing, related process called Web Director available commercially from Cisco that performs redirecting of web requests sent to a first server to a second server in order to offload work to the other servers. When a web request is received at a first server, it is mapped to a second server, and a message is sent back to the client telling it that the web server has been temporarily moved. The web client then transparently connects through the internet to the second server and communicates directly with it. An overview of this process is as follows:

Overview Of How The Director Functions In Http Session Redirector Mode:

1. A client web browser tries to retrieve URL http://www.sleet.com.

2. The Internet DNS system maps this name to the Director virtual IP address 10.0.0.4.

3. The Director listens for HTTP connections to IP address 10.0.0.4.

4. The client web browser connects to IP address 10.0.0.4.

5. The Director performs a look up for the host name associated with the address 10.0.0.4.

6. The Director performs a look up for the IP addresses associated with the host name www-servers.sleet.com. This results in the normal Director sorting of addresses using all of the metrics configured for this host name.

7. The Director then constructs the new URL using the IP address of the discovered "best" web server (for example, http:H/12.0.0.2) appended with the rest of the original URL, and sends the web client the code "302 Temporarily Moved," specifying the new URL location.

If the URL originally requested had been:

http://www.sleet.com/Weather/index.html

Then the new URL would be:

http://12.0.0.2/Neither/index.html

8. The client web browser receives the temporary relocation code and transparently connects to the web server at the specified URL.

Because this is only a temporary relocation, the client web browser should bookmark the original URL (http://www.sleet.com), so users who later return to this URL will once again be connected to the "best" web server for that moment. (In reality, most browsers do not bookmark the correct URL. Browser vendors are likely to fix this behavior.)

For a more detailed discussion of this technology, refer to http://www.cisco.com/univercd/cc/td/doc/product/iaabu/distrdir/dd2501 /http. htm which is hereby incorporated by reference.

The problem with this approach is that it will not work in a network where a storage manager is present and is mapping the data stored on storage devices and monitoring all read and write transactions to and from the storage devices since a redirection method has not been defined or incorporated.

SUMMARY OF THE INVENTION

This invention is useful in any switched fabric network having a centralized storage manager or other device or data path which can act as a bottleneck and through which all read and write requests are directed. The more clients and storage devices there are, the more useful the invention is. Specifically, the invention is advantageous in any switched network environment having a centralized storage manager, one or more storage devices, one or more client devices that access the storage devices indirectly by making requests to the storage manager and a switch network that switches packets or frames having at least source and destination addresses in the header thereof.

The fundamental idea of the invention and the characteristic that all species within the genus of the invention will share is the addition of some intelligence to the switch fabric to intercept at least some of the frames going from the storage device to the storage manager and re-label them and redirect them directly to the requesting client without going through the storage manager or other bottleneck while writing the headers so that they look like they did come from the storage manager. Also part of this fundamental idea is that there must be processing to redirect at least some of the frames propagating from the client (also called the host) to the storage manager so that they bypass the storage manager and go directly from the client to the device through the switch while being relabeled (relabeled or relabels as those terms are used herein means to substitute header fields from one or more redirection commands into the headers of frames that are being redirected so that they appear to come from the storage manager even though the redirection process actually bypasses the storage manager) so that they look like they came from the storage manager. This redirection process is done by instructing processes in the switch ports (or other circuitry in the switch) to which the storage devices and client devices are coupled to intercept frames directed to the storage manager in response to read and write requests, and to relabel them to direct them directly to the client or the device without going through the storage manager, but to replace various fields in the headers of these frames to make them look like they came from the storage manager instead of the storage device itself. This allows the storage device and client device software and hardware to remain structured as it has been in the past and not require any modifications. This is a serious advantage to implementing this technology since the client and storage device circuitry is not usually made by the maker of the switch and/or the storage manager.

In a write transaction, two ports are involved in the redirection. The switch port coupled to the client device is programmed to relabel for redirection data frames originating at the client to go directly to the storage device. Likewise, the switch port coupled to the storage device is programmed to re-label for redirection transfer ready frames returning from the storage device so that they go directly to the client.

In either case, the new destination addresses resulting from the interception and relabelling cause the switch network to set up a new switch connection to bypass the storage manager. This minimizes delays caused by the storage manager server and eases the burden on its memory and processing power and internal data paths.

This redirection notion is generally most applicable to local area or storage area networks where there is a storage manager for virtualizing storage devices (such as non striped RAID controllers) that can act as a bottleneck and a switch network which can be modified to carry out the redirection process. "Virtualizing storage devices" means that the storage manager manages one or storage devices and appears to the client devices to be a storage device even though the actual data is not stored on the storage manager itself. Some of the claims are directed only to switches that work with storage managers that redirect read and/or write transactions to go around the storage manager so that it is not a bottleneck. It is the intent of the inventors in these claims to not limit the storage manager to the specific embodiments of storage managers disclosed herein but to claim a switch that works with any storage manager that can "virtualize storage devices". Further, the storage manager and the switch might be combined on the same circuit board or in the same enclosure so as to not be separate units. However, so long as the portions of the circuit that do the switching has a structure and operates in the way defined for any of the switch embodiments disclosed herein, such a switch/storage manager would be within the teachings of the invention. Likewise for claims directly solely to the storage manager.

The notion of the invention can also be extended to wide area networks where there are devices through which all read and write transactions must pass and which can become bottlenecks.

There are four basic classes of embodiments within the genus of the invention.

The first class of embodiments has a switch and storage manager which cooperate to relabel and redirect every read or write request such that the switch assumes the alias of the storage manager.

An important second class of alternative embodiments, analyzes the number of outstanding requests to read and/or write data to the storage devices and relabels and redirects packets or frames only when a threshold of traffic is reached where the storage manager is likely to be a bottleneck. This threshold can be programmable.

A third class of embodiments has a storage manager that monitors the time between receipt of a read or write request and the time that the actual data read from the storage device as a result of said read request is sent from the storage manager back to the client device which requested it and performs a parallel process for write requests. When the time equals or exceeds a predetermined threshold, which can be programmable, the storage manager issues a redirection requests for all subsequent read and write requests until the time drops below the threshold.

A fourth class of embodiments happens in storage managers that have cache. In these embodiments, the decision whether to do redirection or not depends upon the cache algorithm and whether it wants the requested data in the cache or not. For example, all large transactions that would to fill or dominate most of the cache space may be redirected, while smaller transactions or transactions from certain high use areas on the storage devices would not be redirected so that they can be copied into cache.

The invention is therefore a genus of species all of who share the characteristics of, at least when the storage manager is liable to be a bottleneck, sending redirection commands to the switch which cause the switch to relabel and redirect data packets or frames between clients, servers and storage devices such that selected packets or frames from clients or storage devices that normally would pass through the storage manager are relabelled and redirected to bypass the storage manager and pass directly between the client and the storage device through the switch. This is done without the knowledge of the clients or storage devices and does not require any medications of the hardware or software of either the storage client or the storage device. This prevents the storage manager server from becoming a bottleneck by allowing direct data transfers between the clients and storage devices. The storage server is typically the intelligence that communicates the information to the selected network elements that do the re-labelling and redirecting of packets.

Any hardware and/or software structure that can accomplish this interception and re-labelling and re-direction will suffice to practice the invention.

BRIEF DESCRIPTION OF THE DRAWINGS

FIGS. 2A through 2D are a table that lists the sequence of events that must occur in a preferred class of embodiments in each of the switch, storage device, storage manager and client device to implement an alias read transaction using the invention to redirect every data frame of every read transaction.

FIGS. 4A through 4E are a table that lists the sequence of events that must occur in a preferred class of embodiments in each of the switch, storage device, storage manager and client device to implement an aliased write transaction using the invention to redirect every data frame of every write transaction.

DETAILED DESCRIPTION OF THE PREFERRED AND ALTERNATIVE EMBODIMENTS

Referring to FIGS. 2A through 2B, there is shown a table giving the sequence of events that must occur to implement the process of one species within the invention in carrying out a read transaction and redirecting all frames. Basically, the invention can be implemented by modifying the software in the storage manager 20 and switch 14 in the prior art structure of FIG. 1 to carry out the sequence of events listed in the tables of FIGS. 2A through 2B. The term "switch" as used in the claims should be understood as including not only single packet or frame switches but also combinations of physically separate switches all coupled to form a network and having a protocol to exchange information with each other to implement the switching function.

The tables of FIGS. 2A through 2B identify the functions that occur in each of the switch 14, a storage device such as 16 or 18, the storage manager 20 and a client device such as 10 or 12 to carry out the re-labeling and re-direction of packets to implement the invention. Each function is numbered by a number in parenthesis, and will be discussed in a like numbered section below.

FIG. 2A, Step (1)

Figure 5:
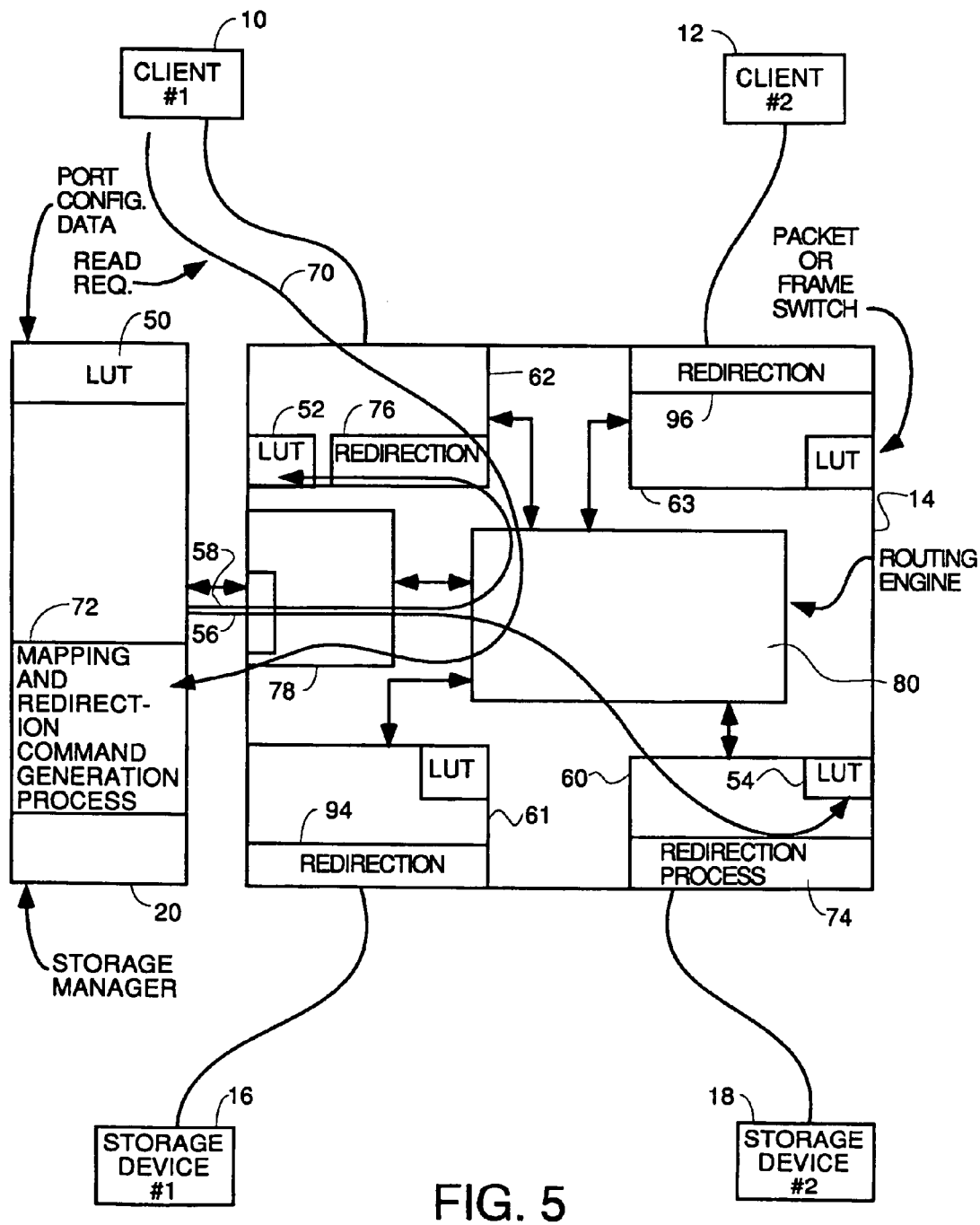
FIG. 5 is a block diagram of a system employing species in the preferred classes of storage managers and switches where every data frame is redirected and redirection commands are sent only to the ports involved.

The preferred and alternative embodiments detailed in FIG. 2A to the end sends the redirection commands only to the particular port to which the storage device storing the requested read data is connected. This does not happen embodiments where every port receives and stores a copy of every redirection command. In these alternative embodiments, a copy of every redirection command is sent to every port for storage by the storage manager or are only sent to one master port on the switch which then copies them to all other ports. The embodiment wherein the redirection commands are sent only to specific, appropriate ports to which the client and storage device are connected minimizes the amount of storage in the switch ports needed for redirection commands and minimizes the amount of time consumed in sending redirection commands to ports, and is preferred. In such embodiments, the storage manager must know to which ports of the switch each storage device is connected. Therefore, in this class of embodiments, the first thing that must happen is that the storage manager 20 must learn or be configured to know to which ports on switch 14 each of the clients 10 and 12 and each of the storage devices 16 and 18 are coupled. This is most easily done by manually storing configuration data in the storage manager that maps each client and storage device to a port on the switch. In other embodiments, the switch 14 or the storage manager can do an automatic discovery process by sending out probes to every port of the switch to be forwarded to every device coupled to that port to request the port ID(s) of the device(s) connected to that port be returned. FIG. 5 represents an embodiment where the configuration data regarding which clients and storage devices are coupled to which ports is stored in a look up table 50 in the storage manager. This allows redirection commands to be sent to the specific ports coupled to the clients and storage devices involved and stored in look up tables in only those ports. An example is shown in FIG. 5 wherein redirection commands represented by arrows 56 (the "second redirection command") and 58 (the "first redirection command") are sent from the storage manager 20 through the switch 14 to look up tables 54 and 52, respectively in ports 60 and 62, respectively. These ports are coupled to storage device 18 and client 10, respectively.

Figure 6:
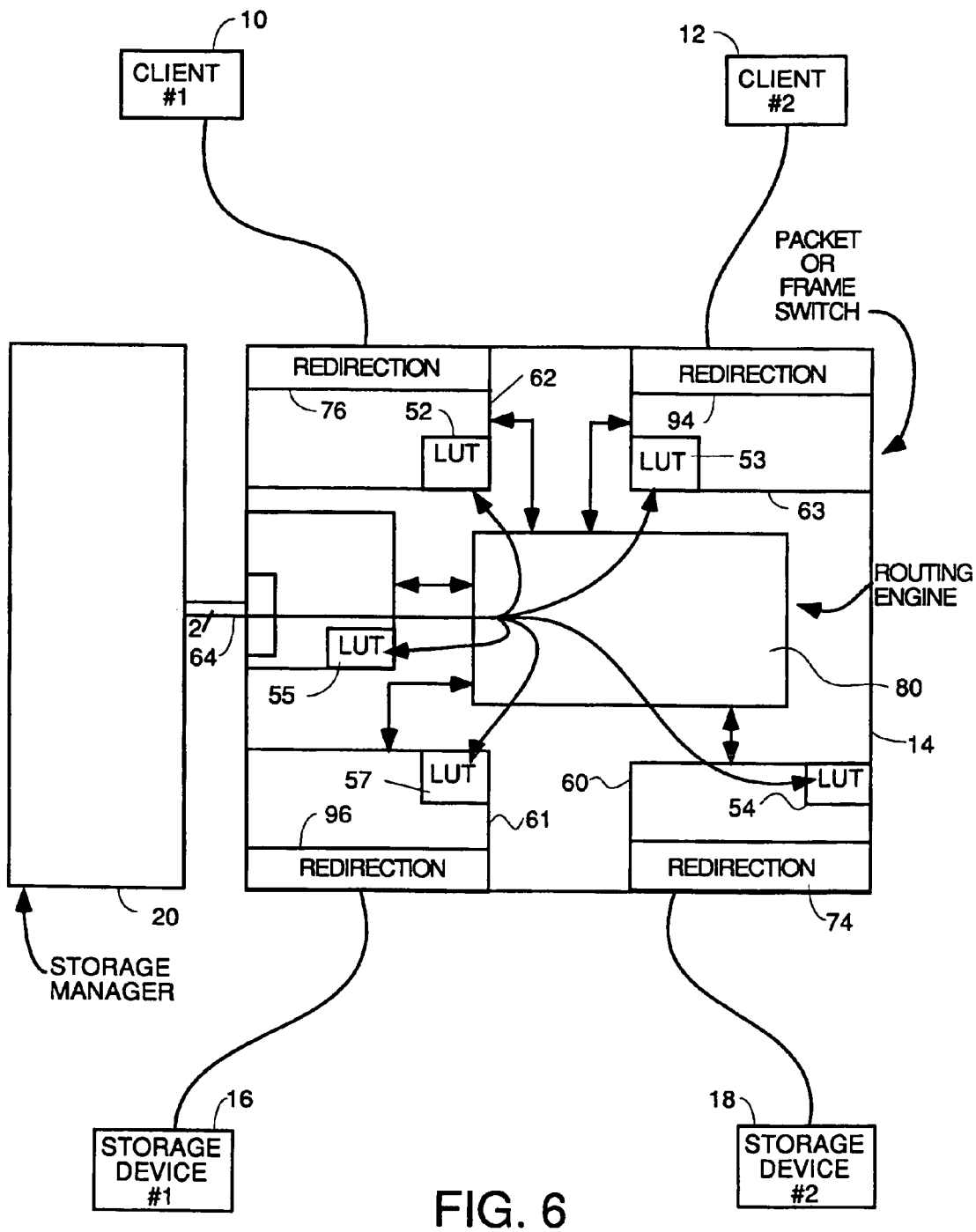
FIG. 6 represents a class of embodiments where every port has a look up table and every redirection command is broadcast to all redirection processes for storage in their local lookup tables regardless the port would be involved in the redirection represented by any particular redirection command.

In alternative embodiments, represented by FIG. 6, there is a look up table in every port and redirection commands, represented by arrow 64, are broadcast to all look up tables for storage. In these embodiments, the storage manager does not need to have a look up table to store configuration data or do a discovery process because every port stores a copy of every redirection command. Thus, regardless of which client and storage device are involved in a particular transaction, the data frames involved in the read or write transaction to be redirected will have header information that matches an entry in the look up table of whatever port then arrived on. In this class of embodiments, step 1 in FIG. 2A can be eliminated.

FIG. 2A, Step (2)

Next, the client device (hereafter sometimes called the host) sends a read command to the storage manager requesting specified SCSI blocks. In this example, the read request is for blocks 7–11. That read request is represented by arrow 70 in FIG. 5. The client 10 also assigns an originator exchange ID to this transaction and writes into the FC frame header encapsulating the SCSI read command and leaves the responder exchange ID blank. The source address in the header of this frame is set to the port ID of the host, and the destination ID is set to the port ID of the storage manager (hereafter sometimes just referred to as the manager).

FIG. 2A, Step (3)

The storage manager 20 responds to the read request by mapping the requested blocks to a storage device number and the blocks on that device that correspond to the requested block numbers. In the example here, storage device 18 has the requested information. The storage manager also determines which client sent the request from the source address in the FC frame header information of the frame including the read request. This process is performed by a mapping and redirection command generation process represented by block 72 in FIG. 5.

FIG. 2A, Step (4)

Next, the storage manager's mapping and redirection command generation process 74 generates and sends a "second redirection command" to the appropriate one or more redirection processes in switch 14. The "second redirection command" is defined below as to content, but, for now, understand that it is called the second redirection command only because it redirects only responder frames. Every FC frame has a field in the header which indicates whether the frame came from the originator in an exchange or the responder in that exchange. The second redirection command will have as part of its search key a specification that it is to act only upon responder frames using this originator/responder header field.

In the particular example given in FIG. 5, for a read request, two redirection commands are utilized to cover embodiments where there is a protocol requiring the host to issue a transer ready frame when it is ready to receive the read data. However, in existing FC networks, the host does not issue the read command until it is ready to receive the read data. Thus, in the preferred embodiment, only one redirection command is needed on a read request, and that redirection command works only on responder frames traveling from the device to the host. This second redirection command is represented by arrow 56 in FIG. 5, and is sent to a redirection process 74 in port 60 coupled to storage device 18, and is stored in lookup table 54. Thus, in the preferred embodiment, the redirection command 58 is not needed. In embodiments where it is needed, it is sent to redirection process 76 of port 62 coupled to the host and stored in lookup table 52.

Each redirection process 74 and 76 recognizes the message as a redirection command and stores it in its local look up table (54 and 52). There are several different embodiments for how this can be done, and step (4) represents all of the below described preferred and alternative embodiments and equivalents thereof.

In the alternative embodiment represented by FIG. 5, two separate redirection commands 56 and 58 are sent to the switch. The storage manager knows which ports are coupled to the client device which initiated the read request and the storage device from which the responses to the read command will come. A first redirection command 58 is sent to the port 78 of the switch to which the storage manager is connected with a command to direct the redirection command to the port to which the client device is coupled. The redirection command then gets routed through routing engine 80 to redirection process 74, and similarly for redirection command 58.

Figure 7:
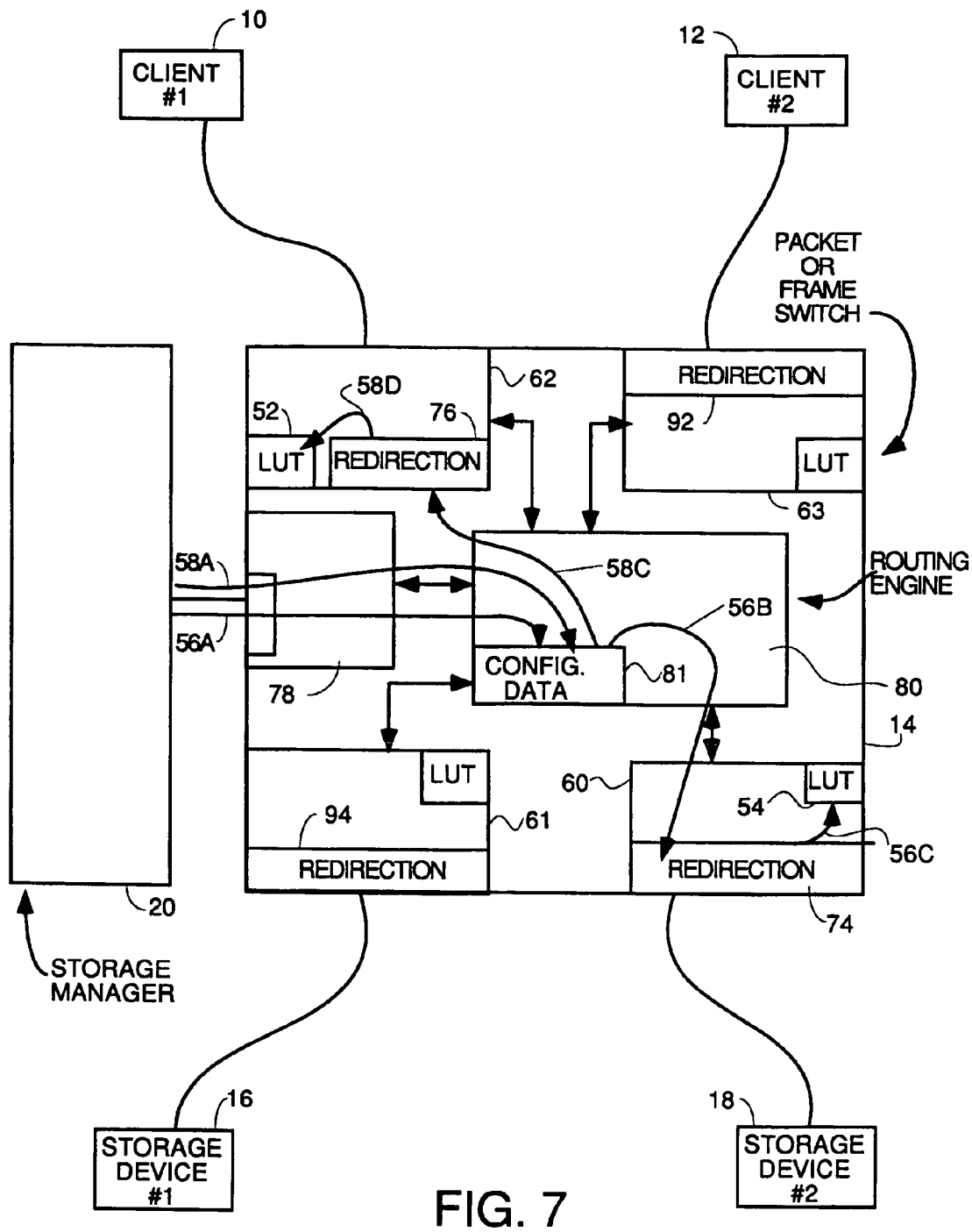
FIG. 7 represents a class of embodiments where the storage manager does not have configuration data but the switch does and the switch uses its configuration data to determine to which ports each incoming redirection command is to be sent for storage.

In an alternative embodiment represented by FIG. 7, the switch also contains a copy of the configuration or discovery data and knows which port is coupled to which device. In this alternative embodiment, the switch port that receives the redirection commands does not need to be told to which port to forward each redirection command. In this embodiment, the switch port 78 simply looks up the port IDs in the destination and source address fields of the new address data of the redirection command in the switch's copy of the configuration/discovery data. From this, it determines to which ports the redirection commands need be sent, and sends them there, as represented by arrows 56A, 56B and 56C for port 60 and arrows 58A, 58B and 58C for port 62.

In the preferred embodiment, in read transactions the client device is assumed to have all the buffer space it needs for the requested data so it does not issue transfer ready frames. Thus, there is no need in the preferred embodiment for a first redirection command 58 to redirect transfer ready frames in read transactions. However, in alternative embodiments where the client device does issue transfer ready frames, there would be a first redirection command issued. In such alternative read transaction embodiments, the first redirection command 58 functions to redirect read transfer ready frames and write data frames initiated by the client device 10 so as to bypass the storage manager 20 and be sent directly to the storage device 18. The "old address data" of the first redirection command 58 contains the originator exchange ID originally assigned by the client device 10, the Port_ID of the client device 10 as the source address, the Port_ID of the storage manager 20 as the destination address, and the responder exchange ID assigned by the manager 20 (collectively referred to in the claims as the old address data). The corresponding "new address data" in first redirection command 58 is the originator exchange ID assigned by the storage manager to the storage-manager-to-storage-device side of the transaction, the Port_ID of the storage device 18 as the destination address, the Port_ID of the storage manager 20 as the source address, and the responder exchange ID assigned by the storage device 18 (collectively referred to in the claims as the new address data). Note that at this point in the process, the manager 20 does not know what the responder exchange ID assigned by the target storage device will be because it has not yet been assigned by the device since the device 18 has not yet received the read command. Thus, in the first redirection command 58 issued by the manager, the manager leaves the responder exchange ID blank. This responder exchange ID will be filled in later by either by the switch 14 or the storage manager 20 depending upon which embodiment to be described below is implement. In the first embodiment, a read command is forwarded by the manager to the device, and the device assigns a responder exchange ID and puts it in the read transaction data frame. The switch sees this data frame, redirects it, and copies the responder exchange ID from the frame header and writes into the the appropriate field of the new address data of the appropriate first redirection command.

The second redirection command 56 is sent, in the preferred embodiment, to the port of the switch to which the storage manager is connected with a command to direct the redirection command to the port 60 to which the storage device 18 is coupled. Alternatively, as symbolized by FIG. 7, the switch port figures out where to forward the second redirection command using its own configuration data 81. One or the other of these same processes also occurred for the first redirection command 58.

The second redirection command 56 functions to redirect data transfer frames originating at the storage device as a result of the read request and containing the actual requested data so as to bypass the storage manager and be sent directly to the requesting client device. The "old address data" of the second redirection command contains the originator exchange ID assigned by the storage manager to the storage-manager-to-storage-device side of the transaction, the Port_ID of the storage device 18 as the source address, and the Port_ID of the storage manager 20 as the destination address, and the responder exchange ID assigned by the storage device 10 for this transaction (collectively referred to in the claims as the "old address data"). The value for this responder exchange ID in the old address data is not necessary for redirection. The corresponding "new address data" of the second redirection command contains the originator exchange ID originally assigned by the requesting client 10, the Port_ID of the client device 10 as the destination address, the Port_ID of the storage manager 20 as the source address, and the responder exchange ID assigned by the storage manager 20 for the transaction with the client (collectively referred to in the claims as the "new address data").

Both these redirection commands are stored in one or more look up tables depending upon the particular configuration of the switch. In one alternative embodiment represented by FIG. 8, both redirection commands can be stored in a single shared look up table 90 anywhere in the switch that the ports can access. In alternative embodiments, the two redirection commands can be combined into a single redirection entry in a shared look up table 90 with two sets of old address data and two sets of new address data. In any embodiment, the first redirection command will be effective only for frames marked as originator frames and the second redirection command will be effective only for frames marked as responder frames.

In the preferred embodiment, each port of the switch maintains its own look up table which stores only the redirection commands pertaining to the storage device or client to which the port is connected. Further, in the preferred embodiment, each port contains an intelligence in the form of a redirection process, represented by blocks 74, 76, 92 and 94 in FIG. 5, that can use the redirection command data to relabel and forward frames or packets arriving at the port to the conventional switch routing engine 80 for redirection in accordance with the processing described herein.

In the class of embodiments represented by FIG. 5, the storage manager is configured with a look up table 50 of configuration data that is written after the network is wired that tells the storage manager which storage devices and which client devices are coupled to the various ports of the switch. FIG. 5 also represents an alternative embodiment wherein the storage manager does a discovery process after the network is up to determine which devices are coupled to which ports by sending out a series of probes that get routed to all the devices coupled to all the ports and which ask for replies that identify the devices by their port IDs. Once the configuration of the network is determined, the configuration data is written into look up table 50.

In all embodiments, ports connected to client devices use the set of first redirection commands stored in the port's local look up table or a single shared look up table to screen incoming frames using the old address data of the active redirection commands to find appropriate frames to be relabelled for redirection. The function of the redirection process in every port is to pick frames or packets that have a data type that is either "data" or "transfer ready" and which have address data in the header which matches an "old address data" entry of an active redirection command in whatever redirection command look up table is being used. Upon finding such a frame, it is relabelled using the corresponding "new address data" and forwarded to the conventional routing process 80 of the switch for redirection.

Similarly, in all embodiments, ports coupled to storage devices use the set of second redirection commands stored in the port's local look up table or a single shared look up table to screen incoming frames to be relabelled for redirection. The function of the redirection process in every port is to pick frames or packets that have a data type that is either "data" or "transfer ready" and which have address data in the header which matches an "old address data" entry in the redirection command look up table. Upon finding such a frame, it is relabelled using the corresponding "new address data" and forwarded to the conventional routing process 80 of the switch for redirection.

Basically, the redirection process just changes the address data in the header so that the data or transfer ready frame is routed directly to the storage device or client and skips the storage manager but looks like it came from the storage manager. The redirection process also replaces the originator and responder exchange IDs to make the frame or packet have an exchange ID such that it get recognized and routed in the destination device to the correct process which requested the data or wanted to write the data.

In embodiments where each port of the switch has its own look up table, the alternative embodiment represented by FIG. 6 has the storage manager carrying out step (4) by sending the redirection commands to the port to which it is connected with instructions. The instructions tell the port to redistribute the redirection commands to the redirection process of every port of the switch through the internal pathways of the switch. The redirection processes then store each received redirection command in the local look up table of each port regardless of whether that port would be involved in the redirection specified by the redirection command. This implements a distributed database where each port has a complete copy of the look up table containing all the redirection commands.

Figure 8:
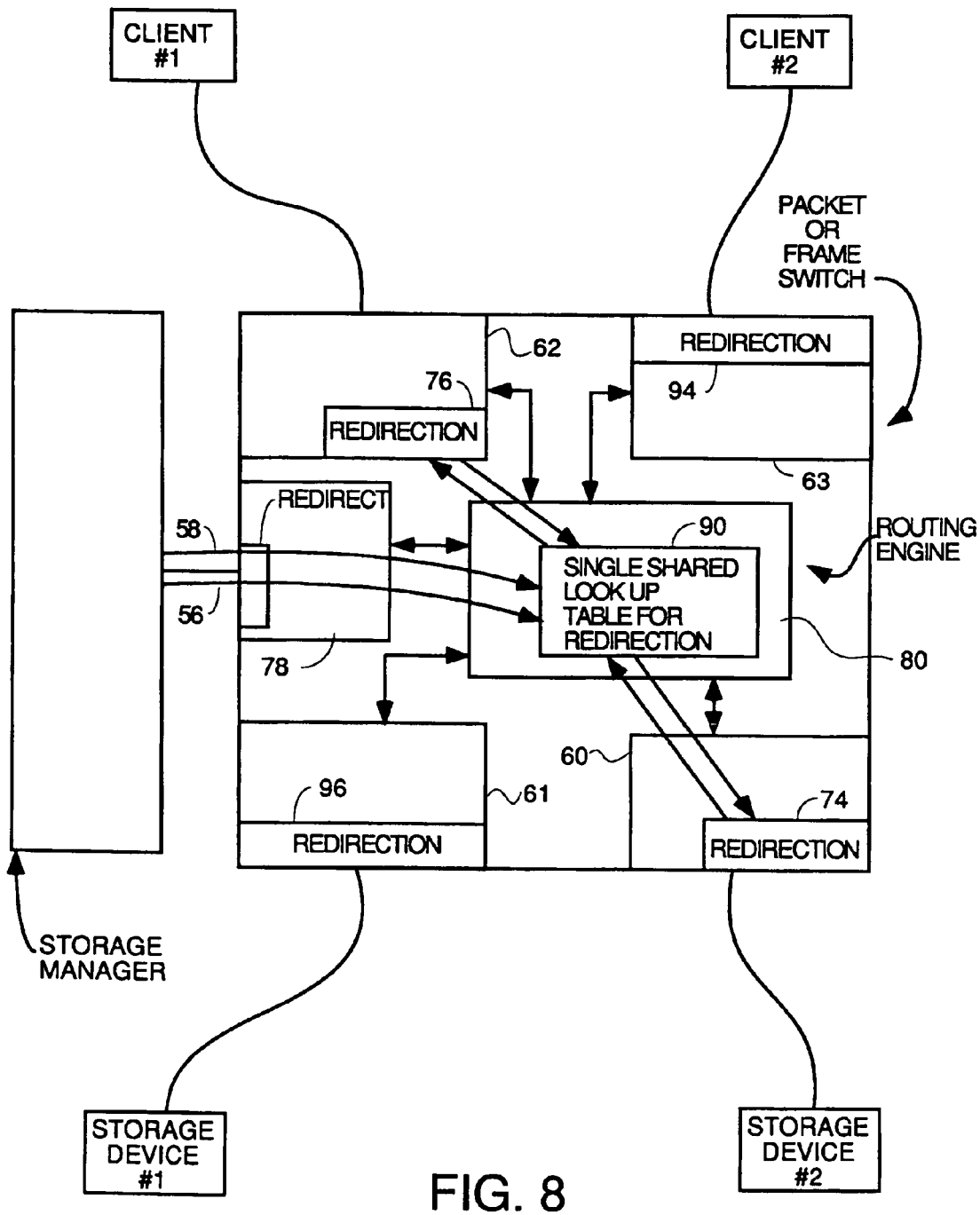
FIG. 8 represents a class of embodiments where a single shared look up table in the switch stores all redirection commands and is shared by all redirection processes in the ports.

In other embodiments represented by FIG. 8, a centralized look up table 90 in the switch is shared by all the ports and is used to store all redirection commands regardless of which port they arrived on or pertain to. In these embodiments, the storage manager sends the redirection commands to the port to which it is connected. That port then stores the redirection commands in the shared look up table 90. In this class of alternative embodiments, all the ports have the functionality to store redirection commands they receive in the shared look up table 90. Further, all the redirection processes 74, 76, 94 and 96 have the functionality to be able to use the shared look up table 90 to screen incoming frames or packets. In these embodiments, the ports each search the centralized look up table for matches on the old address data in frames or packets they receive. The ports then relabel a packet or frame for redirection if the frame is a data or transfer ready frame and a match is found between the frame's header data and the old address data of either a first or second redirection command, as appropriate. In other words, in the preferred FC read transaction embodiment, the search is conducted in the second redirection commands only if the frame is marked as a responder frame.

Figure 9:
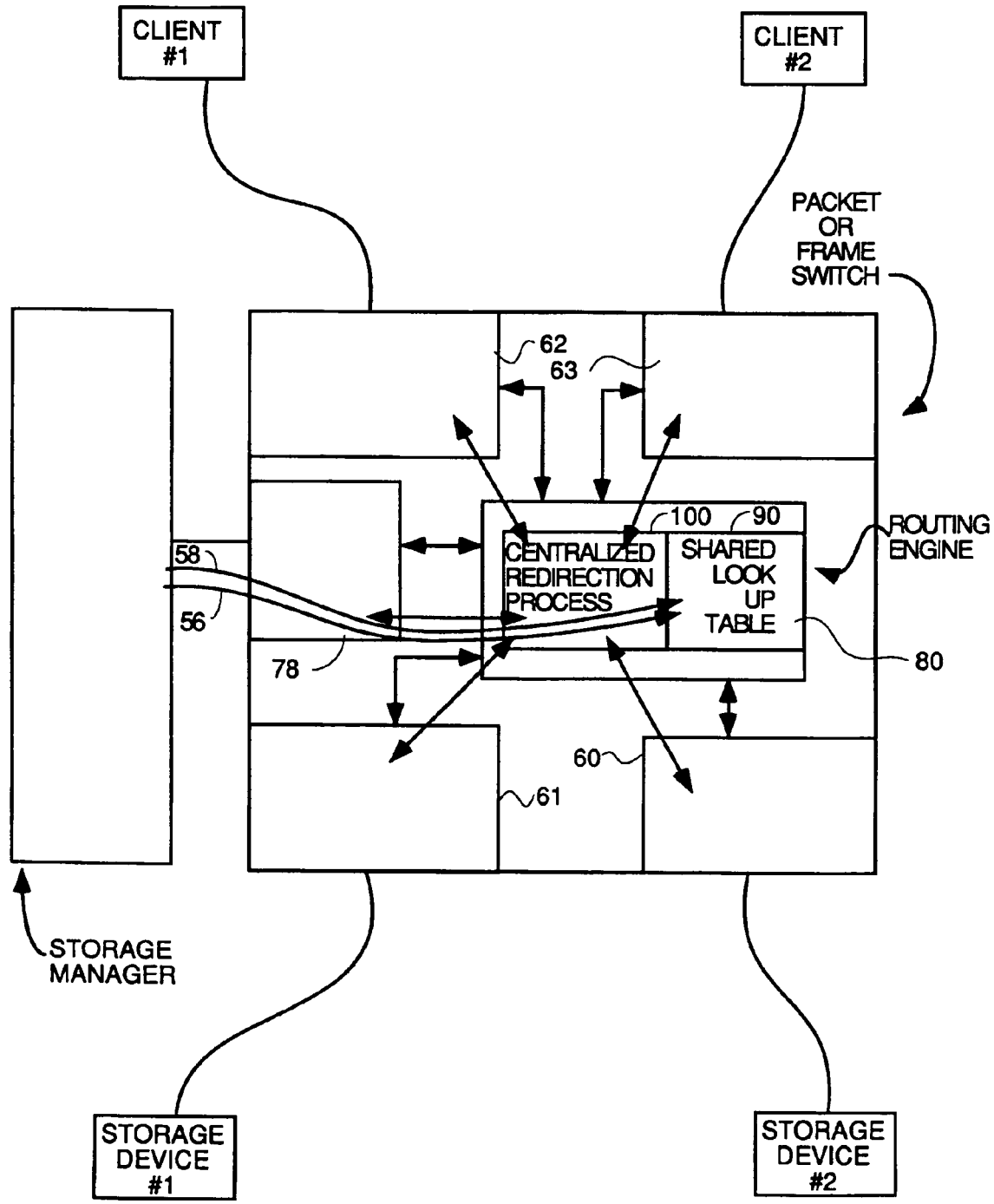
FIG. 9 represents another class of alternative embodiments wherein the switch has a centralized redirection process 98 as part of the routing process, and all the ports are standard and forward frames they receive to this centralized redirection process.

In another class of alternative embodiments represented by FIG. 9, the switch has a centralized redirection process 98 100 as part of the routing process, and all the ports are standard and forward frames they receive to this centralized redirection process. In this embodiment, the centralized redirection process 100 98 receives each frame from a port and uses the data type information in the header to determine if the frame is "data" or "transfer ready" and is marked as a responder frame. If so, a redirection search is necessary. To perform the redirection search, the originator exchange ID, the source address and the destination addresses in the header are compared to the "old address data" in the second redirection command entries in the shared look up table 90. In other embodiments, other appropriate search keys can be used to determine if the frame needs to be redirected. If a match is found, the frame is relabelled with the corresponding "new address data" and passed to the conventional routing process 80.

Preferably, the redirection processes 74, 76, 94 and 96 in the switch ports or the centralized redirection process 100 98 do not need to be told which frames to redirect since they automatically redirect only data frames and transfer ready frames of the responder type and not status or other frames. Status frames are not redirected in most of the embodiments. This is because they are used by the storage manager to determine when a read or write transaction has been completed. Further, in some embodiments, the arrival of the status frame at the manager causes the storage manager to terminate the internal transaction processes and send a status frame to the client. The arrival of the status frame at the manager also, in some embodiments, causes the manager to determine that the redirection process is done, and send a purge command to the switch to purge obsolete redirection commands for that transaction. The storage manager needs to know when the data transfer is done so that it can send a purge command to the switch to purge the pertinent redirection commands out of the look up table(s) in this class of embodiments. However, in the preferred embodiment, the status frame first arrives at the switch and is not redirected and therefore gets routed to the storage manager. The difference between this preferred embodiment and the class of embodiments where the storage manager sends purge commands is that the switch automatically purges all pertinent redirection command when it sees the status frame arrive from the storage device.

The second redirection command for the port to which the storage device is coupled may also tell the port coupled to the storage device to which port the relabelled frame is to be forwarded in some embodiments, although in most embodiments, the relabelled frame is just passed to the conventional routing engine where the new address data makes it clear to which port the frame is to be sent. The correct port to which the frame or packet should be directed within the switch would be the port coupled to the client device that requested the data. Likewise, the port coupled to the client may be instructed by the first redirection command to forward a relabelled frame to the port coupled to the storage device to which the frame is addressed. Telling the port that does the relabelling to which port to forward the relabelled frame only occurs in some embodiments where the routing process is to be bypassed for redirected frames. In the preferred embodiment, this instruction is not necessary.

FIG. 2A, Step (5)

Next, the storage manager sends a read command naming the desired blocks to the storage device determined in step (3). This read command is encapsulated in an FC frame and in the case of a Fibre Channel Arbitrated Loop (FCAL) topology, it is enclosed within an arbitrated loop tenancy. This frame has the Port_ID of the storage manager as the source address and the Port_ID of the storage device as its destination address and will have a new originator exchange ID assigned by the storage manager. When transfer ready or data frames are returned from the storage device and need to be redirected, they will have: a source address equal to the port ID of the storage device; a destination address equal to the port ID of the manager; originator exchange ID equal to the originator exchange ID assigned by the storage manager for this transaction; and a responder exchange ID assigned by the storage device. However, when they get redirected to the client 10, they need to be relabelled. The relabelling is per the "new address data" in the second redirection command, and is as follows: the source address equal to the manager Port_ID; the destination address is set equal to the port ID of the client; the originator exchange ID will be set to the originator exchange ID assigned by the host for this transaction; and a responder ID assigned by the storage manager for this transaction. The exchange ID relabelling is necessary to prevent the client 10 from getting confused. If the exchange ID relabelling was not done, the client probably would not know to which read request the incoming frame was a response (unless there was only one outstanding read request), and would not know to which process in the client to send the frame.

FIG. 2A, Step (6)

The storage device receives the read request and retrieves the requested blocks of read data. The storage device encapsulates the data in one or more frames or packets (although frames are used for this example, the invention applies equally well to packet switches). These frames have the storage manager's Port_ID as the destination address and have the storage device's Port_ID as the source address and have the originator exchange ID assigned by the storage manager to the data retrieval transaction set up in response to the original read request, and have a responder exchange ID selected by the storage device for this transaction.

FIG. 2A, Step (7)

The redirection processes in the switch ports (or a centralized redirection process in the embodiment of FIG. 9) examines the incoming frame to determine if it needs to be redirected. It will only redirect data or transfer frames that are marked as responder frames in the header. If those preconditions are met, the switch generate a search key taken from the header data in the incoming frame. In the preferred embodiment, the search key is comprised of the source address, destination address and originator exchange ID of the incoming frame. In other embodiments, any other appropriate search key apparent to those skilled in the art can be used, possibly including the port number at which the frame arrived. The redirection process in the switch then compares the search key to the "old address data" of all active second redirection commands in the appropriate lookup table.

In the preferred embodiment, this comparison process is done only after the header of the frame is examined to determine that the incoming frame is a data frame or a transfer ready frame. In alternative embodiments, the search key generation and comparison processes can be ongoing in a parallel, simultaneous process with the determination of whether the frame is data or transfer ready and is a responder frame.

Frames that are not data or transfer ready or are not responder frames are passed directly to the conventional routing process 80 in the switch and no processing to determine if they have to be redirected is carried out.

In our example, redirection process 74 in FIG. 5 examines the header information in every incoming frame and compares the destination addresses and originator exchange ID of data and transfer ready responder frames to the old address data entries in lookup table 54. In the class of embodiments represented by FIG. 8, redirection process 74 compares the search key data to the old address data in the shared lookup table 90. This processing sequence in the preferred embodiment avoids the latency that would be inherent in scanning the look up table for matches on status frames or other frames which are not to be redirected. Status frames are not redirected since they must go to the storage manager so that the storage manager can know when the transfer is completed. Also, when the transaction is completed, the obsolete redirection commands must be purged. This can be done either by sending a purge command from the storage manager to the switch that identifies the information that needs to be purged, or it can be done automatically by a switch port as the status frame passes through it.

The header examination process actually happens at every port in some embodiments, but in other embodiments, it only happens at ports which have active redirection commands.

When a data or transfer ready frame arrives with search key data that matches one of the second redirection commands received from the storage manager, a redirection process is carried out. This is done by redirection circuitry in the port (or a central shared redirection process 100 98 in the embodiments represented by FIG. 9). The redirection process changes the header to remove the old source and destination addresses and the old originator and responder exchange ID. Then the redirection process substitutes the corresponding new address data from the matching redirection command. This adds a new source and destination address and the originator and responder exchange ID contained in the new address data. It is important to note that the new address data substituted into the redirected frame makes the frame appear to have come from the storage manager.

By making the redirected frames look like they came from the storage manager, the requesting client's hardware and software can be totally unmodified. This saves the time and expense of upgrading all the clients when the invention is first deployed into an existing system. That is, by making the relabelled, redirected frame look like the frame came from the storage manager, the client devices can have the same structure and operate in the same way as they did in a prior art network. Note also that the storage devices do not have to have any different structure or operation than they had in the prior art. These are characteristics that all species in the genus will share and which are important to acceptance of the invention in the field.

The only things that need to be modified to implement the invention in any prior art switched fabric network are the software of the storage manager and switch. The storage manager must be modified to add the process 72 in FIG. 5 to generate and send and purge redirection commands. The software of the switch must be modified to add one or more redirection processes and lookup tables per the embodiments of FIGS. 5–9. The software of the storage manager needs to be modified to issue the redirection commands as described herein.

However, in alternative embodiments, the software of the requesting clients can be modified so as to not get confused when a read request is sent to a storage manager and the return data comes back directly from the storage device. In these alternative embodiments, the ports of the switch do not have to substitute the storage manager Port_ID and responder exchange ID for the storage device Port_ID and exchange ID in return data and transfer ready frames. In such embodiments, the redirection process carried out in the switch just substitutes the Port_ID of the client as the destination address and leaves the Port_ID of the storage device as the source address and makes sure the originator exchange ID originally assigned by the client is in the frame. When the client receives these frames, it maps them to the original requests it made so that the data can be routed to the correct process in the client that made the request.

FIG. 2B, Step (8)

The conventional routing process 80 of switch 14 then examines the new destination address of the relabelled frame and determines to which port to forward the frame by looking up the new destination address (the Port_ID of the client that made the original request) in its routing tables. This is not a new process as the switch examines the destination address of every incoming frame at every port to determine which port to which the frame needs to be forwarded so this process in the switch is doing the same thing it did in the prior art and does not need to be modified. The frame will then be forwarded to the port to which the client device is coupled. The switch 14 is therefore conventional in design in the preferred embodiment except that the port software (or, in some embodiments, the central routing process software 80) in the switch is modified to receive and store redirection commands in a look up table and to carry out the redirection process described herein and a similar write request processes detailed in FIGS. 3A through 3C. In alternative embodiments represented by FIG. 9, the redirection process is carried out by a central redirection process 100 98 that interfaces each port 60, 61, 62 and 63 to the routing process 80. In such embodiments, the ports are conventional and the routing circuitry is conventional. The improvement in this switch is the addition of a central shared look up table 90 and centralized redirection process 98 that receives and stores the redirection commands and processes incoming frames passed to it from the ports to implement the redirection process. The nature of the circuitry in either the port or the centralized circuitry to do the redirection process is not critical so long as it has sufficient speed to handle the traffic load. Discrete logic, a programmed microprocessor, or an application specific integrated circuit or even a DSP can be used to implement the functionality described herein.

Existing prior art Fibre Channel switches that couple arbitrated loops through switches to fabric have a similar header replacement process to redirect frames from the loop to the fabric and vice versa. This redirection is done to accommodate the different addressing schemes and not to bypass a bottleneck however.

FIG. 2B, Step (9)

The client device 10 receives the redirected frame or frames and processes them to give the data therein to whatever process in the client requested the read data.

FIG. 2C, Step (10)

The storage device, after transmitting all the requested read data, sends a "good status" frame addressed to the storage manager.

FIG. 2C, Step (11)

The redirection process in the switch port or centralized redirection circuitry sees this "good status" frame, and reads the frame type flag in the header and realizes the "good status" frame is not data or a transfer ready type frame and is not to be redirected. Thus, although the source and destination addresses and the originator exchange ID match a redirection command, no header modification is done since the port redirection process is programmed to recognize, relabel and redirect only data and transfer ready frames of a responder type in read transactions.

In the preferred embodiment, the switch detects either good or bad status frames, indicating the transaction is done, and automatically purges all redirection commands associated with that transaction.

FIGS. 2C and 2D, Step (12)

The storage manager receives the "good status" or "bad status" frame from the storage device, and terminates its internal processes associated with that transaction. Then, the manager sends a good or bad status frame, as the case may be, to the client.

The switch port to which the storage manager is connected does not modify the header as it is not a data frame and the source and destination addresses do not match any redirection command anyway.

In alternative embodiments where the switch does not automatically purge redirection commands when it sees a status frame, the storage manager also sends a purge command to the switch to purge the redirection commands that pertain to the data transfer just completed. The purge command identifies by at least the old address data the redirection commands that need to be purged. Purging needs to be completed before the storage manager can process a new command from a client which formerly had one or more outstanding redirection commands. This is necessary to make sure that responses to this new command do not get falsely redirected. This purging process also occurs in all embodiments for write transaction redirections.

In the preferred embodiment, status frames are not redirected and are forwarded to the storage manager. However, instead of the storage manager receiving the status frame and sending back specific purge commands, the port which received the status frame automatically purges the obsolete redirection commands after or as the status command is being forwarded to the storage manager. Further, in all cases, the automatic purging will be completed before the storage manager could start another transaction between the same host and disk pair. In the case of a read transaction, the port does this automatic purging after determining that the frame is status, and that the address data of the status frame otherwise qualifies to be redirected per the old address data in any second redirection command stored in any lookup table the switch.

In the case of a write transaction, the port finds and purges the pertinent first redirection command utilizing appropriately the pertinent second redirection commands address data to search through the lookup tables of all the ports or, at least the ports which have the pertinent redirection commands stored in them.

In an alternative purging embodiment, instead of searching for the first redirection command, the switch embeds linking information in the second redirection command that indicates the existence and location of the paired first redirection command for this transaction. The switch can then use this linking information when a status frame is received and go directly to the location of the paired first redirection command and purge it.

FIG. 2D, Step (13)

In the alternative embodiments where the switch does not automatically purge redirections commands, the switch receives the purge command from storage manager and purges the corresponding redirection commands from the lookup tables.

In the embodiments represented by FIG. 5, the purge commands get routed by port 78 to the redirection processes 74 and 76 which then use at least the old address data in the purge command to find and purge the matching entries in look up tables 54 and 52.

In the embodiment represented by FIG. 6, the purge command is routed to each of the redirection processes 74, 96, 94 and 76 and used to find and purge the matching entries in look up tables 52, 53, 55, 57, 54.

In the embodiment of FIG. 7, the purge commands are sent to the routing process 80 which determines which ports they need to be sent using configuration data 81 and sends them there. The redirection processes then purge the appropriate commands.

In the embodiment of FIG. 8, the purge command is sent to redirection processes 74 and 76 which use it to purge the appropriate redirection commands from look up table 90.

In the embodiment of FIG. 9, the purge command is sent to redirection process 98 and used to purge the appropriate redirection commands from shared lookup table 90.

Figure 3:
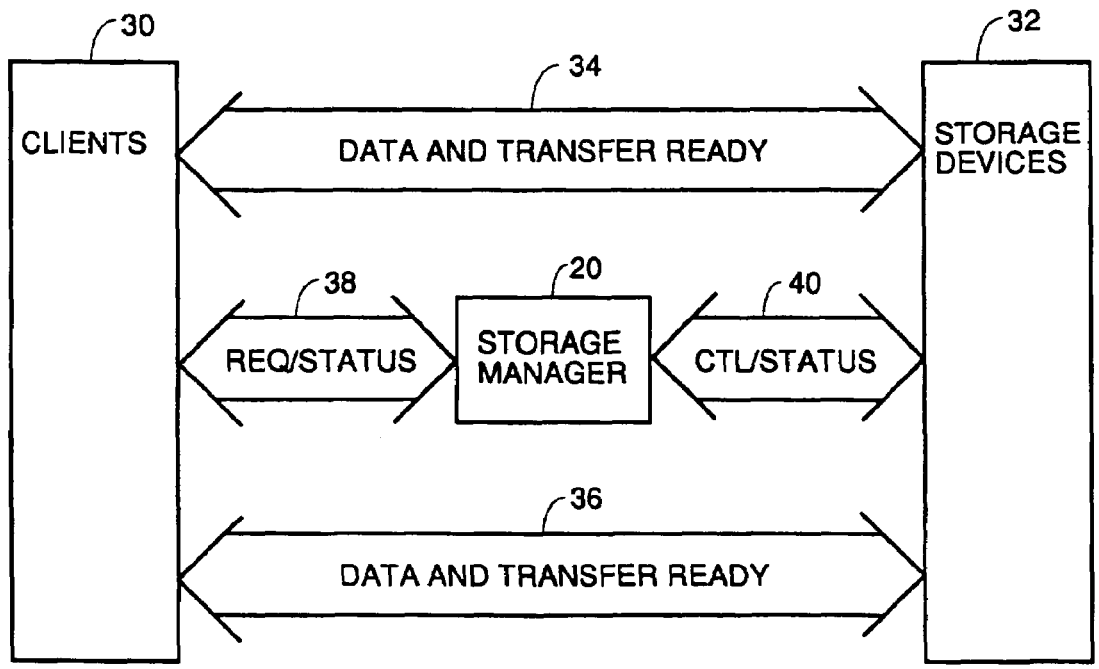
FIG. 3 is a symbolic diagram of traffic flow in a system according to the teachings of the invention.

FIG. 3 is a symbolic diagram of traffic flow in a system according to the teachings of the invention. Block 30 represents the collective client devices that are requesting reads and writes to storage. The collective storage devices are represented by block 32. The operation of the storage manager in any one of the four different classes of embodiments identified in the summary of the invention causes selected data and transfer ready frames or packets to be relabelled and redirected so that they 4re sent basically directly between the storage device and the client device that requested the read or write, as symbolized by arrows 34 and 36. Control and status packets or frames still pass through the storage manager, as symbolized by arrows 38 and 40. The switch 14 is not shown, but it is the operation of the switch that causes the bypassing of the storage manager for data and transfer ready frames.

Storage Manager

Some storage managers cache data blocks that are frequently requested. Thus, when a block of data is requested which is already stored in cache, the storage manager never sends the read request to the storage device which stores it and just sends the data from cache. In these types of embodiments, there is an alternative class of embodiments to monitor the usefulness of the caching scheme using any criteria which can monitor the effectiveness of the caching scheme. In this class of embodiments, the storage manager will issue redirection commands only when the data is determined to be not beneficial for caching purposes. One such criteria that can be used to monitor the effectiveness of the caching scheme is to count the number of requests for which there were cache hits.

Another alternative embodiment utilizes a service manager that only redirects large data requests since redirecting short transfers is not efficient because of the overhead of setting up the redirection process. In these embodiments, every read or write request that comes in is analyzed to determine how much data is to be read and how much data is to be written. If the amount of data blocks requested is greater than equal to a threshold, which can be programmable, then the storage manager sends a redirection command as previously described.

In some embodiments, the storage manager 20 in FIG. 3 does a discovery process to determine which storage devices are coupled to which ports of the switch. This way, redirection commands for particular storage devices can be sent directly to the port of the switch coupled to that storage device. This is done through the port to which the storage manager is connected and the internal pathways of the switch. In such an embodiment, each port maintains a look up table that stores just the redirection commands that pertain to the storage device(s) coupled to that port.

In other simpler embodiments, the storage manager can send every redirection command to every port for storage in the look up table of the port. In this embodiment, each port maintains its own look up table, and every redirection command is sent to every port thereby causing a replicated database of look up commands to be stored such that each port has a copy of the entire look up table.

In other embodiments, a centralized look up table in the switch which is shared by all the ports can be used to store all redirection commands regardless of which port they arrived on or pertain to. In these embodiments, the storage manager sends the look up commands to any one port, because all the ports function to store redirection commands they receive in the shared look up table. In these embodiments, the ports each search the centralized look up table for matches on the old address data in frames or packets they receive and relabel for redirection if a match is found on a data or transfer ready frame. In other embodiments, each port of the switch has functionality to receive redirection commands, store them in a shared look up table or distribute them to all other ports of the switch for storage in each port's individual look up table.

There are four basic classes of embodiments within the genus of the invention, each of which uses a switch with ports capable of comparing old address data to redirection data in a look up table and readdressing and redirecting at least data and transfer ready frames or packets. The differences between these embodiments pertain to the structure and operation of the storage manager server. Some of them only redirect when it makes sense to do so because of high traffic loads.

The first class of embodiments has a switch and storage manager which cooperate to relabel and redirect every read or write request such that the switch assumes the alias of the storage manager, i.e., the switch relabels the frame to direct it directly to the requesting client instead of the storage manager server and sets the source address of the frame as that of the storage manager even though it is actually coming from the switch. This latter aspect of aliasing is important and is a shared characteristic that all embodiments discussed anywhere herein will share and which defines one of the characteristics that all species or embodiments in the genus will share.

An important second class of alternative embodiments, analyzes the number of outstanding requests to read and/or write data to the storage devices and relabels and redirects packets or frames only when a threshold of traffic is reached where the storage manager is likely to be a bottleneck. This threshold can be programmable.

A third class of embodiments has a storage manager that monitors the time between receipt of a read or write request and the time that the actual data read from the storage device as a result of said read request is sent from the storage manager back to the client device which requested it and performs a parallel process for write requests. When the time equals or exceeds a predetermined threshold, which can be programmable, the storage manager issues a redirection requests for all subsequent read and write requests until the time drops below the threshold.

The fourth basic class of embodiments is used in storage managers with cache memory. In this class, redirection is done only when the cache algorithm does not elect to copy the data of the transaction into cache memory, such as where the caching algorithm elects to redirect long transactions but not redirect short.

Storage Device as Aliased Storage Manager

Figure 1:
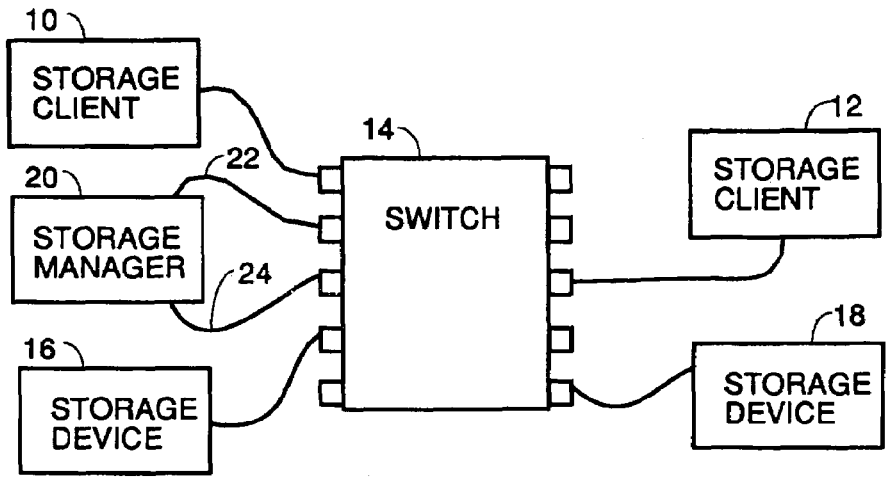
FIG. 1 shows a typical network configuration implemented with a switch in which the invention can be implemented.

In another class of embodiments, instead of the switch 14 in FIG. 1 being modified to alias itself as the storage manager 20, the switch can be a normal packet or frame switch of any conventional design and the storage devices 12 and 16 and 18 could do the aliasing. In this class of embodiments, each storage device in the network is modified to have a port which can do aliasing like the ports in the "aliased switch" embodiments described above. In this class of embodiments, the storage manager acts similarly to the way it acts in any of the "aliased switch" embodiments described above, but instead of sending the redirection commands to the switch, they are sent to the storage device to which the read request is directed. The ports of all the storage devices are structured to receive these redirection commands and store them in a look up table. The redirection commands will have old address data and new address data just like the redirection commands in the "aliased switch" embodiments where the old address data will include as the destination address the address of the storage manager and the address of the storage device as the source address, and each old address will have a exchange ID assigned by the storage manager when the read request was received. The exchange ID will again be the key to proper relabelling. This is because it is the exchange ID assigned by the storage manager for the storage-device-to-storage-manager data transfers that maps to the actual client device which made the read request. The new address data for every old address entry will have the client address as the destination and the storage manager address as the source and will have the exchange ID assigned by the client that made the request as was the case for the "aliased switch" embodiments.

When frames or packets of read data are ready to send from the storage device, the port looks at the source port ID, the destination port ID and the originator exchange ID and originator or responder frame type of each packet and determines whether the frame is data or transfer ready type packets. If the packet is of a data or transfer ready type and the originator exchange ID and destination ID matches any entry in the old address data of the look up table, the port knows the packet or frame should be relabelled. The packet or frame is then relabelled using the "new address data" of the matching redirection command entry. The packet or frame is then sent to the switch 14, and, there it gets routed directly to the client device that requested it.

Frame Aliased Write Transaction

Referring to FIG. 4, comprised of FIGS. 4A through 4E, there is shown a table that defines the process implemented by the invention to redirect every write transaction frame or packet. Each step in the process will be discussed in a separate section below.

FIG. 4A, Step 1

The preferred embodiment sends the redirection commands for write transactions only to the particular ports to which the storage device storing the requested read data and the client port are connected. This minimizes the amount of storage in the switch ports needed for redirection commands in embodiments where the redirection commands are stored in look up tables in the ports themselves. This approach also minimizes the amount of time consumed in sending redirection commands to ports as compared to broadcasting them to all ports. Of course in the embodiments where there is a centralized redirection process and centralized lookup table, there is no need to configure the storage manager with data telling it which devices are coupled to which ports so step 1 can be omitted. Step 1 can be omitted in both centralized look up table embodiments and embodiments were all redirection commands are broadcast to all ports.

However, in embodiments where redirection commands are sent only to the ports involved and the ports each maintain their own lookup table, the storage manager must know to which ports of the switch each storage device and client are connected. The first thing that happens in some embodiments is that the storage manager 20 learns or is configured to know to which ports on switch 14 each of the clients 10 and 12 and each of the storage devices 16 and 18 are coupled. This is most easily done by manually setting configuration data in the storage manager that maps each client and storage device to a port on the switch 14. In other embodiments, the storage manager can do an automatic discovery process by sending out probes to every port of the switch to be forwarded to every device coupled to that port to request the PA(s) of the device(s) connected to that port be returned.

FIG. 4A, Step 2

Next, the client device sends a write command to the storage manager.

FIG. 4A, Step 3

The storage manager receives the write command and examines it to determine in a conventional manner on which storage device the data needs to be stored. Basically, the blocks of data identified in the request are mapped to the storage device on which they are to be stored. The write command frame or packet header is also examined to determine from which client device the write command came. The storage manager then composes two redirection commands and sends them to the switch for storage in one or more look up tables.

There is a "first redirection command" in redirected write transaction to redirect data frames travelling from the client to the switch to the storage manager so that they travel from the client to the switch to the storage device. The first redirection command will cause originator data frames of a write transaction to bypass the storage manager and be sent by the switch directly to the storage device. The "old address data" in this first redirection command will be: the original originator exchange ID assigned by the client to the client-storage manager transaction when the initial request was made; the Port_ID of the storage manager as the destination address; the Port_ID of the client device from which the request originated as the source address; and the responder exchange ID which will be assigned by the storage manager for this client-manager side transaction.

The "new address data" of this write transaction first redirection command will be: the Port_ID of the storage device as the destination address; the Port_ID of the storage manager as the source address; the originator exchange ID assigned by the storage manager for manager-device transaction; and the responder exchange ID assigned by the storage device for this transaction. Note that this responder exchange ID will not be entered by the storage manager at this point in the transaction, but will be filled in later with the responder exchange ID assigned by the storage device taken from the first transfer ready or data frame from the storage device.

There is also a "second redirection command" in write transactions to redirect transfer ready, responder type frames travelling from the storage device to the storage manager to bypass the storage manager and go directly to the client device. The transfer ready frame is a message to the client that the storage device has buffer space to store more frames and acts as a handshaking "clear to send" message to keep the client from overrunning the storage device buffer. The "old address data" of this second redirection command is: the originator exchange ID assigned by the storage manager to storage device side of the transaction; the Port_ID of the storage manager as the destination address; the Port_ID of the storage device as the source address; and the responder exchange ID assigned by the storage device.

The corresponding "new address data" will be: the original originator exchange ID assigned by the client when the original write request was made; the Port_ID of the original requesting client as the destination address; the Port_ID of the storage manager as the source address so that the redirected frame looks to the storage device like it came from the storage manager; and responder exchange ID assigned by the storage manager for this transaction. This allows the storage device hardware and software to remain conventional and not need any modifications.

These two redirection commands are stored in the appropriate look up table in the switch. The two redirection commands effectively alias the transaction such that it looks to the storage device like the data frames following the write request came from the storage manager instead of directly from the client. The redirection command also make it looks to the client like the transfer ready frames came from the storage manager instead of the storage device. This aliasing property allows the client and storage device hardware and software to remain unchanged.

In alternative embodiments, the information contained in the two redirection commands could be combined into a single redirection command with more fields.

FIGS. 4A through 4C represents a subclass of embodiments within the genus of the invention where every write transaction is redirected. The genus of the invention has the shared characteristic that all species will alias at least some read and at least some write transactions. However, there are several different alternative embodiments within this genus. The difference between these embodiments arises from whether the redirection process is carried out in the ports or by a central redirection process which is part of the routing process and whether every data and transfer ready frame is redirected or redirection only occurs when the storage manager is becoming a bottleneck or other reasons. Further, differences arise from whether each port has its own look up table to use for redirection or there is a single look up table shared by all the ports or used by the central redirection process for redirection processing.

FIG. 4A–4B, Step (4)

Next, the storage manager responds to receiving the write request by sending a write command to the storage device and assigns an originator exchange ID to the transaction.

FIG. 4B, Step (5)

The storage device responds to the write command by sending a transfer ready frame toward the storage manager as soon as it has buffer space available. The transfer ready frame has the storage manager Port_ID as its destination address and the storage device Port_ID as its source address and has the originator exchange ID assigned by the storage manager in the write command and has a responder exchange ID supplied by the storage device for this particular transaction.

FIG. 4B, Step (6)

The switch recognizes this transfer ready frame as a frame to be redirected by preparing a search key comprised of the source address, the destination address and the originator exchange ID from the transfer ready frame. This search key is compared to the old address data of all the second redirection commands stored in the switch lookup tables. If a match is found, the switch copies the responder exchange ID from the frame and writes it into the responder exchange ID field of the new address data of the first redirection command for this transaction. Next, the switch redirection process relabels the frame for redirection to the client by substituting the linked new address data of the matching second redirection command and passing the relabelled frame to the conventional routing process, thereby bypassing the storage manager. This happens in various ways depending upon the embodiment. In the embodiments of FIGS. 5, 6 and 7, the redirection process 74 receives the frame and first determines that it is a transfer ready frame. The redirection process then compares the originator exchange ID and the source and destination addresses in the frame header to the old address data in look up table 54. If a match is found, the header is rewritten using the new address data of the matching entry in look up table 54, and the frame is passed to the routing process 80 and, from there, transmitted directly to the client 10 from the switch 14 bypassing the storage manager. However, the new address data makes the frame look like it came from the storage manager so that the client software does not get confused.

In the embodiments represented by FIG. 8, the redirection process 74 of port 60 does all the same things just described, but compares the header to the old address data in look up table 90.

In the embodiments represented by FIG. 9, the transfer ready frame is forwarded to the centralized redirection process 98 which determines it is a transfer ready frame. The header information is then compared to the old address data in the shared look up table 90, and processing is thereafter the same.

FIG. 4B, Step (7)

The client receives the redirected transfer ready frame, and responds by sending one or more frames of data addressed to the storage manager toward the storage manager. The write data frame(s) transmitted in response to each transfer ready frame will have the Port_ID of the storage manager as its destination address and the Port_ID of the client as the source address and will have the originator exchange ID originally assigned by the client, and a responder exchange ID originally assigned by the storage manager for this manager-client transaction.

FIG. 4C, Step (8)

The switch receives the data frames and recognizes them as originator data frames which qualifies them for redirection if a matching first redirection command is found. It then uses the header data in the data frames as a search key or constructs a search key which is some subset of the header data, and uses the key to search the old address data of the active first redirection commands in the appropriate look up table(s). In most embodiments, the appropriate look up table is the look up table stored in the port that received the data frame or frames, but in alternative embodiments, it is a central shared look up table.

If a match is found, the header of the frame or frames is relabelled using the new address data of the matching first redirection command, and the relabelled frame or frames are passed to the switching and routing process 80.

This searching and relabelling process can be by the redirection process 76 using look up table 52 in the embodiments of FIGS. 5, 6, and 7 or, in the embodiment of FIG. 8, by redirection process 76 using shared look up table 90. In the embodiment of FIG. 9, the process is carried out by centralized redirection process 98 using shared look up table 90.

FIG. 4C, Step (9)

Next, the storage device receives the data frame or frames and stores the data. If the amount of data to be transferred is greater than indicated by the initial transfer ready, the storage device repeats step (5) as soon as buffer space becomes available and continues until the transfer is complete.

FIG. 4C, Step (10)

The switch repeats steps (5) and (8) as many times as necessary to get all the data frames stored. Specifically, the switch redirects each transfer ready frame to the client as in step (5), and redirects each data frame the client responds with to the storage device as in step (8).

FIG. 4D, Step (11)

The client repeats step (6) as many times as necessary by receiving redirected transfer ready frames and sending data frames to the switch.

FIG. 4D, Step (12)

The storage device knows how many data frames are going to be sent because the original write command specified that fact. When the last data frame has been received and stored properly, the storage device outputs a done status frame addressed to the storage manager.

FIG. 4D, Step (13)

The switch receives this done status frame and recognizes from the data type field in the header that it is a status and not a data or transfer ready type frame, and, therefore, the frame is not to be redirected. The status frame is then sent to the routing process for transmission to the storage manager. In the preferred embodiment, the switch automatically purges the first and second redirection commands that apply to the transaction just completed.

FIG. 4D, Step (14)

The storage manager receives this done status frame and in turn sends a similar one to the client device. Before the storage manager can execute any further write or read commands from that client device however, the redirection commands pertaining to the write transaction just completed must be purged to avoid inadvertent redirections. To do this, in alternative embodiments where the switch does not automatically purge redirection commands when it sees the done status frame, the storage manager determines which redirection commands need to be purged, and issues purge commands to the switch. The redirection commands to be purged are found and purged by the switch in step (16).

The above example, taken from the Fibre Channel technology, assumes that the initial write request from the client indicated how much data was to be written so that the storage device would know when the last frame has been stored and issue a done status frame. However, the invention may also be used in packet based LAN and WAN environments where there is a storage manager or other bottleneck device in which it is advantageous to divert packets around. In these environments, the protocols are different, so any method of the storage manager determining when the transaction is completed given the particular protocol will suffice. In these alternative embodiments, the storage manager determines the transaction has been completed by watching the network traffic for a message that the transaction is done or by a timeout on receiving packets having the particular exchange ID or by any other way supported by the protocol. When the storage manager determines that the transaction is done, it finds the appropriate redirection command or commands and sends purge commands to the switch or router that is doing the redirection.

The switch 14 in each of FIGS. 5 through 9 should be understood in this example and for purposes of interpreting the term "switch" in the claims as being either a single switch or multiple switches which are all connected together in a network and which can communicate by an information protocol to implement the switching and redirection function. In a typical situation with multiple switches in the same network, each switch stores configuration data as to only the local devices to which it is connected. This switch is coupled to the other switches in the network by network data paths. The switches all communicate with each other to route packets and frames properly. Thus, in the example of FIG. 7, suppose that switch 14 was really two different switches, one on the West Coast coupled to some client and storage devices and a storage manager and coupled to another switch on the East Coast by a T1 or other WAN connection. Suppose client 10 is on the West Coast and storage device 18 is on the East Coast. When a write transaction is initiated by client 10 that involves writing data to storage device 18, the storage manager issues redirection commands 58A and 56A to the West Coast switch. The West Coast switch looks at its configuration data 81 and does not find storage device 18. It then carries out a communication protocol with the East Coast switch and any other switches in the network if there are more to find out which switch is coupled to storage device 18. The East Coast switch replies that it is so connected. The West Coast switch then sends redirection command 56B to the East Coast switch which looks up storage device 18 in its lookup table and routes redirection command 56B to redirection process 74 in port 60 which stores the old and new address data in lookup table 54. The redirection process 74, if necessary, alters the new address data or appends data to it to indicate that frames or packets to be redirected in this write transaction need to be sent over the network path to the West Coast switch for further routing.

Figure 10:
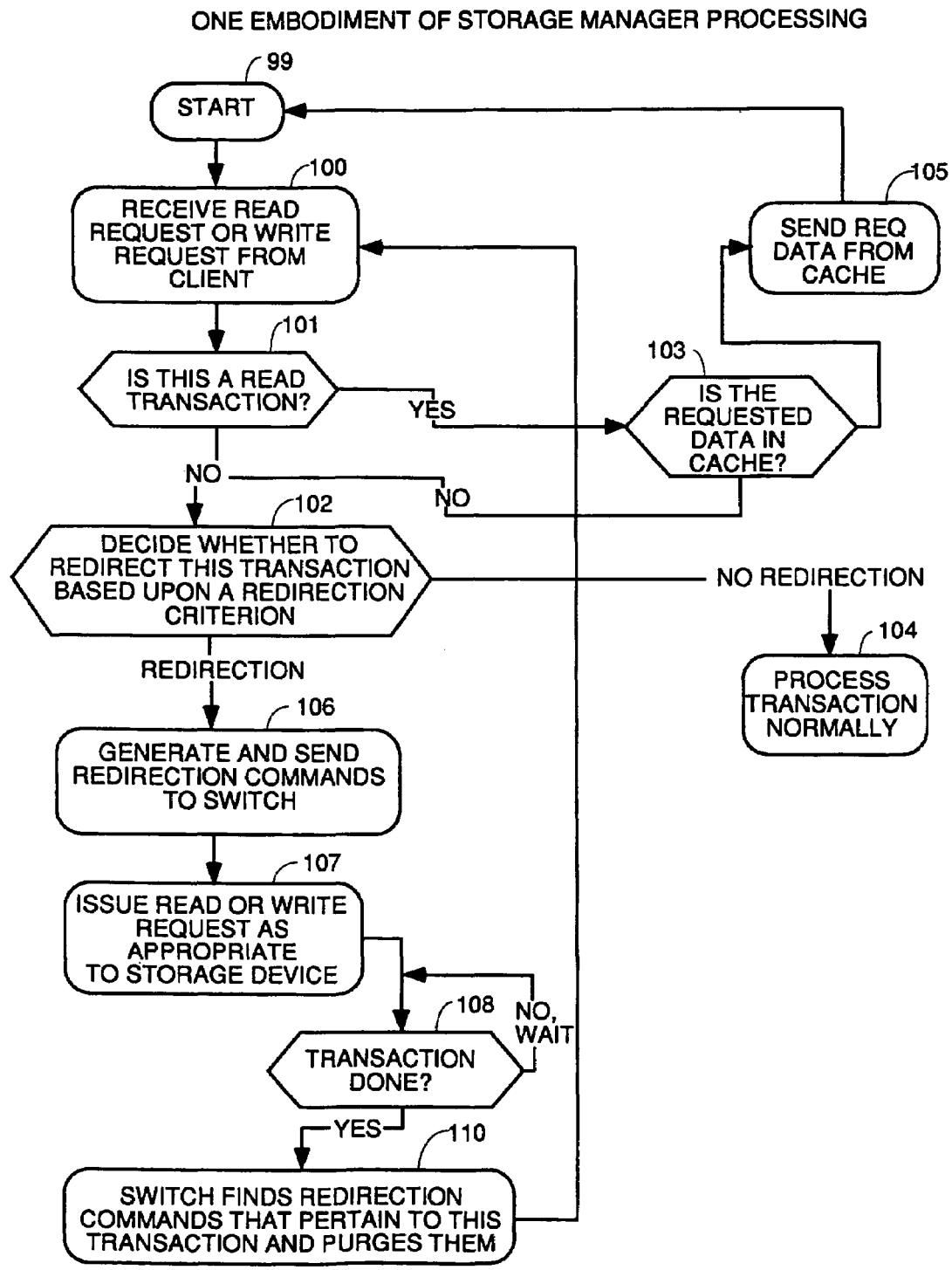
FIG. 10 is a flowchart of the processing in the storage manager to decide whether to redirect, and, if so, to generate and send redirection commands.

Referring to FIG. 10, there is shown a flowchart of the processing in one embodiment of the storage manager to decide whether to redirect, and, if so, to generate and send redirection commands. The process starts in step 99. The storage manager first receives a read or write request from the client or transfer ready frames from the storage device in step 100. In step 101, the storage manager determines if the received request is a read. If so, step 103 is performed to determine if the requested data is stored in cache memory in the storage manager. If so, step 105 is performed to send the requested data from the cache to the client which requested it.

If step 101 determines that the request is not a read request, step 102 is performed. In step 102, the storage manager decides whether it is going to redirect this particular transaction. In the preferred embodiment, every read or write transaction is redirected, but in alternative embodiments, step 102 represents a more complicated decision process. In a second class of embodiments, step 102 represents the process of analyzing the number of outstanding read and/or write requests and comparing that number to a redirection threshold. In some embodiments, this threshold is set by configuration data, and in other embodiments, it is fixed. In this class of embodiments, it is assumed that if the number of outstanding read or write requests equals or exceeds the threshold, that the storage manager has become a bottleneck, and redirection would be beneficial. When the threshold is equalled or exceeded, one or more redirection commands for every request is sent. Purging occurs as each transaction is completed. Redirection automatically stops when the number of outstanding read or write requests drops below the threshold.

In a third class of embodiments, step 102 represents the process of analyzing whether the storage manager actually has become a bottleneck, and a decision to redirect is made if it has. In this class of embodiments, any appropriate criteria or any appropriate measurement made by the storage manager or switch can be used to determine if a bottleneck condition exists. One such criteria is latency. For example, the storage manager can start a counter at the time a read or write request is received and stop the counter at the time the status frame is received indicating the request has been completed. Then the count is compared to a threshold, and if the count exceeds a number in a look up table indicating a bottleneck exist, redirection commands are written and sent. The look up table contains numbers that indicate the maximum time a read or write transaction should take for the size of the transaction.

The redirection decision process in this measured latency type class of embodiments would be to:

(1) determine the size of the read or write from the initial request data and start a counter;

(2) perform conventional read or write transaction processing including sending a read or write command to the appropriate storage device and including forwarding data and transfer ready frames to the client or storage device as appropriate to the particular type of transaction being performed;

(3) look up the appropriate threshold number for that size transaction;

(4) stop said counter when said conventional read or write transaction was completed;

(5) comparing the counter value when the transaction was completed to the threshold number looked up from said look up table as a measure of the time it took to complete the conventional read or write transaction;

(6) if the time taken to complete the conventional read or write transaction exceeded the threshold, generating one or more redirection commands for subsequent read or write requests and sending them to the switch; and (7) performing any method of stopping redirection after some time passes and resuming the latency measuring process of the above steps (1) through (6) for subsequent read or write requests until a latency threshold value is again exceeded, and then repeating steps (6) and (7).

In some embodiments, this redirection would continue for a predetermined, programmable or fixed timeout period and then the process of not redirecting and measuring latency would begin again. In other embodiments, every Xth read or write transaction would not be redirected and its latency measured, and if the latency was at or below the threshold value, redirection would cease and measuring of latency of each subsequent read or write transaction would begin again until the threshold latency was once again exceeded. Purging would occur as each transaction was completed. The redirection would automatically stop when the traffic volume dropped to the extent that the latency values dropped below the values in the table.

In a fourth class of embodiments, the decision represented by step 102 involved determining whether the cache algorithm of the storage manager wants to copy the data of the transaction to cache memory. If so, no redirection commands are issued. If not, then redirection may occur and redirection commands may be issued as detailed in other discussions of the fourth class of embodiments given in the summary of the invention section.

If step 102 determines that no redirection should occur, step 104 is performed representing the normal storage manager processing. Step 104 includes storing the most frequently requested read data in transactions that have not been redirected and which pass through the storage manager in a cache memory in the storage manager so that some read requests can be short circuited by supplying the data from cache. If step 102 determines that redirection should occur, then step 106 is performed to generate and send redirection commands to the switch for each request.

After performing step 106, step 107 is performed to issue read or write requests as appropriate to the storage device. Then test 108 is performed.

Test 108 monitors if the transaction is done according to whatever network protocol is in existence. If the transaction is not done, processing returns again to step 108 to wait for the transaction to complete. The flowchart of FIG. 10 applies to each exchange, and multiple instances of the process of FIG. 10 may be occurring in the storage manager if multiple exchanges are occurring simultaneously.

If a status frame or other indication occurs indicating a particular exchange is done, in an alternative embodiment, the storage manager sends purge commands to the switch directing it to find and purge the appropriate redirection commands that pertain to the exchange just completed, as symbolized by block 110. In the preferred embodiment, the switch sees the status command and automatically purges the appropriate first and second redirection commands and then forwards status frame to the storage manager, also as symbolized by step 110.

Figure 11A:
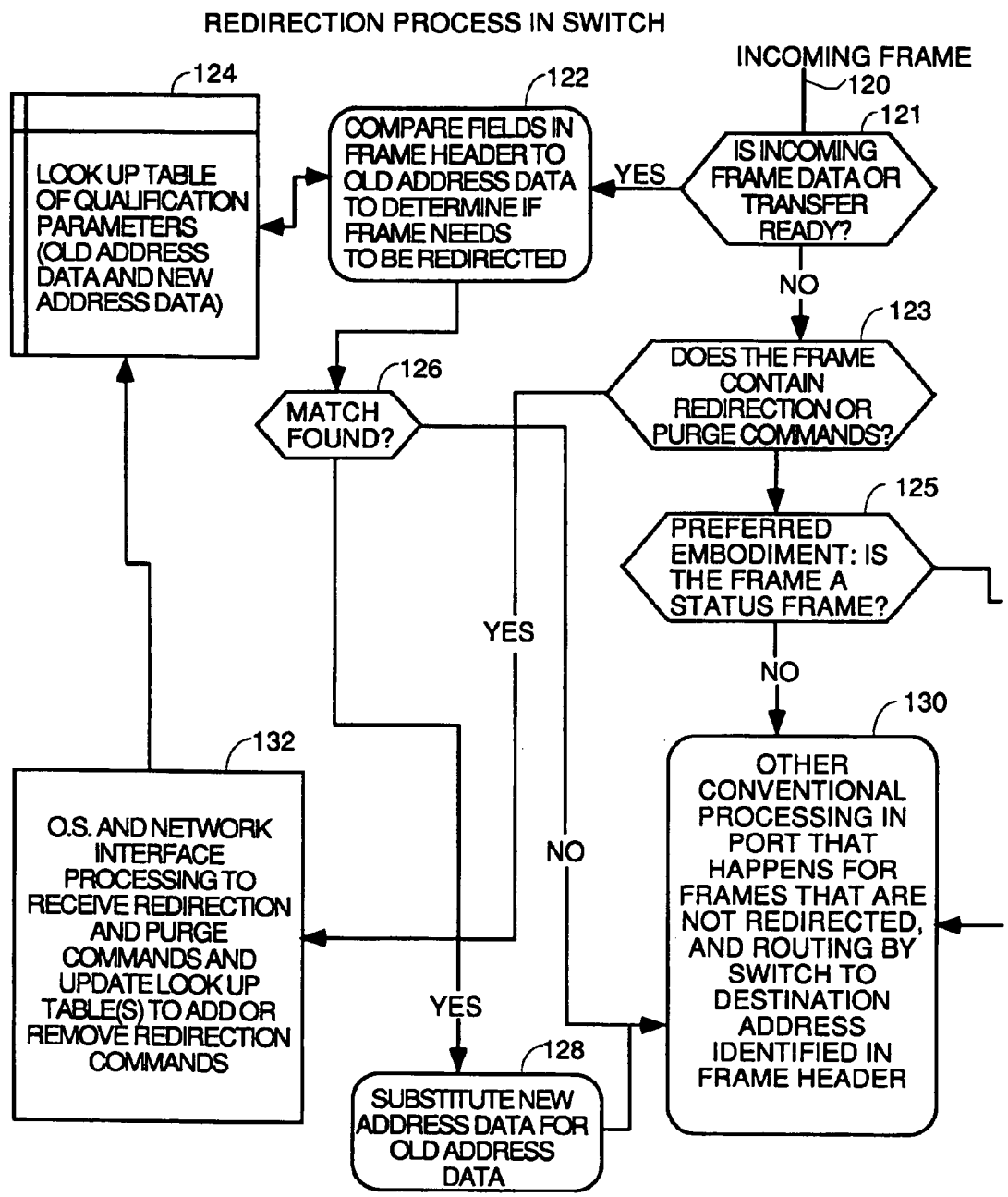
FIG. 11, comprised of FIGS. 11A and 11B, is a flowchart of the processing of the redirection process in each port or the central redirection process to process incoming frames.
Figure 11B:
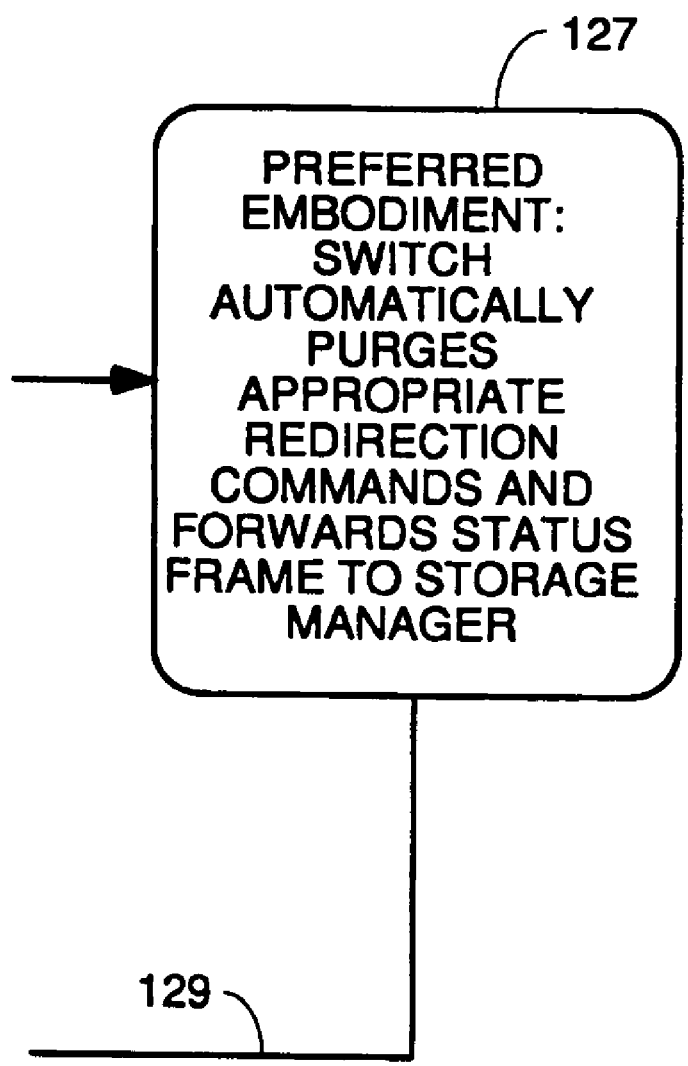

Referring to FIG. 11, which is comprised of FIGS. 11A and 11B, there is shown a flowchart of the processing of the redirection process in each port or the central redirection process to process incoming frames. The flowchart shows only the processing at the logical level of redirection and not any physical layer processing to carry out the physical layer or other protocols that happen regardless of whether a frame is or is not redirected. Each function represented by a step in FIG. 11 can be performed either by a programmed microprocessor, a gate array, an ASIC or a field programmable gate array or conventional switch circuitry such as the routing engine. Further, both FIGS. 10 and 11 are merely exemplary processing flows and the exact process flow of other species within the genus does not to be the same so long as the same functions are achieved in an order which causes the end results achieved by FIGS. 10 and 11 to occur.

Line 120 represents an incoming frame that enters the port and is directed to the port's redirection process, such as process 74 in FIG. 5. In the embodiment of FIG. 9, line 120 represents a frame that has entered a port and been forwarded to the central redirection process 100 98.

Step 121 represents a process of determining whether the newly arrived frame is a data or transfer ready frame because status frames are not redirected. This is done by reading the data type field in the header.

If step 121 determines the frame is not a data or transfer ready frame, step 123 is performed to determine if the incoming frame contains redirection or purge commands. In alternative embodiments, the storage manager receives done status frames and stops its processing for that transaction. Then, it generates and sends to the switch a purge command ordering the switch to find and purge the redirection command(s) that pertain to the transaction just completed. Typically, redirection and purge commands are sent to Fibre Channel switches in ELS frames. However, in some embodiments, overhead such as redirection and purge commands and SNMP management commands and requests are transmitted between the switch and storage manager on a separate physical link or on a separate logical channel such as a subchannel on the same medium as the high speed Fibre Channel, Ethernet, etc. traffic. Step 123 represents the process of detecting redirection or purge commands by whatever means they arrive, and forwarding them to the OS and network interface processing step 132. If a redirection command or purge command has arrived, the frame containing it or the redirection or purge command itself is passed to a process represented by block 132. Step 132 functions to use the redirection and/or purge commands to properly update the look up table 124 in which the old address data and new address data of redirection commands is stored.

If step 123 determines that the incoming frame does not contain redirection or purge commands, in the preferred embodiment, test 125 is performed. Test 125 determines in the switch whether the incoming frame is a status frame. If it is, in this embodiment, the switch will automatically purge all the redirection commands that pertain to this transaction just completed, as represented by block 127 on FIG. 11B. The switch then forwards the status frame to the storage manager, as symbolized by line 129 to block 130. If test 125 determines that the incoming frame is not a status frame, then the frame is forwarded to other conventional processing, as symbolized by block 130.

the frame is forwarded to the process represented by block 130. Block 130 carries out conventional processing on frames that are not redirected.

If step 121 determines the incoming frame is data or a transfer ready frame, processing of step 122 occurs which is the process of examination of the fields in the frame's header to determine if the frame needs to be redirected. This is done by comparing the source and destination address and the originator exchange ID to all the exchange IDs in old address data in the appropriate look up table. The look up table is represented by block 124, and contains the old address data entries and the corresponding new address entries for each transaction in which frames are to be redirected. In the embodiment of FIGS. 8 and 9, table 124 is represented by block 90. In the embodiments of FIGS. 5, 6 and 7, table 124 is represented by the look up tables stored in the ports locally such as blocks 54, 52, 57 and 53.

Next, step 126 determines if a match in the old address data has been found. If so, step 128 is performed to substitute the corresponding new address data from the entry in table 124 that matched for the old address data. If no match is found, the frame is not part of a transaction in which redirection is to occur, so it is forwarded to the conventional processing of step 130 which routes it to its destination.

After the new address data has been substituted, the frame is forwarded to the processing represented by block 130. This block represents the conventional processing that occurs for every frame that is not redirected and routing by the switch routing engine to the port coupled to the device identified in the destination address.

Block 132 represents the processing carried out by the operating system of the switch or port and the interface processing to receive redirection commands and purge commands from the system manager and to use them to add redirection commands to the look up table and to purge redirection commands from the look up table for transactions that have been completed.

Figure 12:
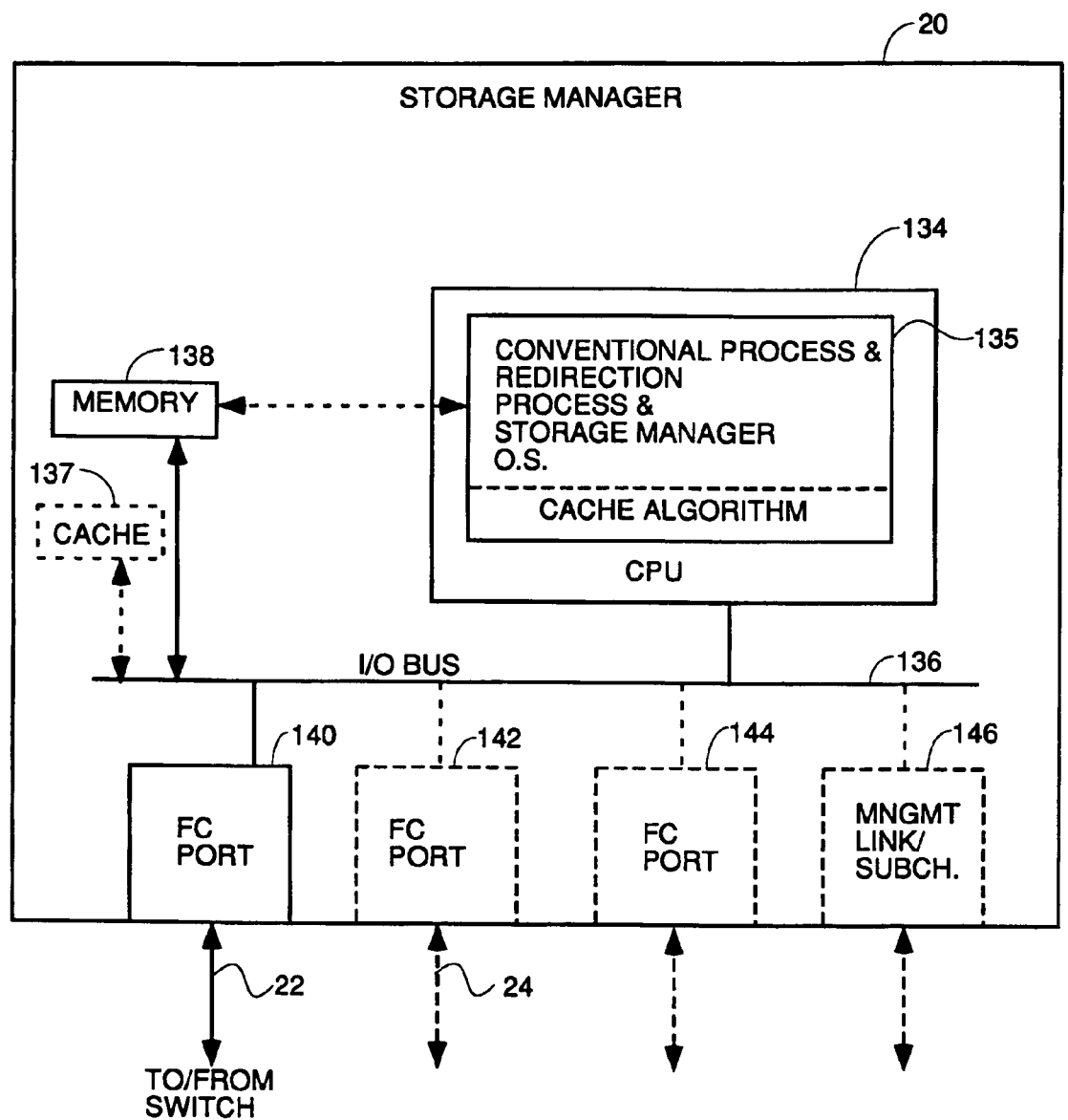
FIG. 12 is a block diagram of the pertinent hardware of a typical storage manager.
Figure 13:
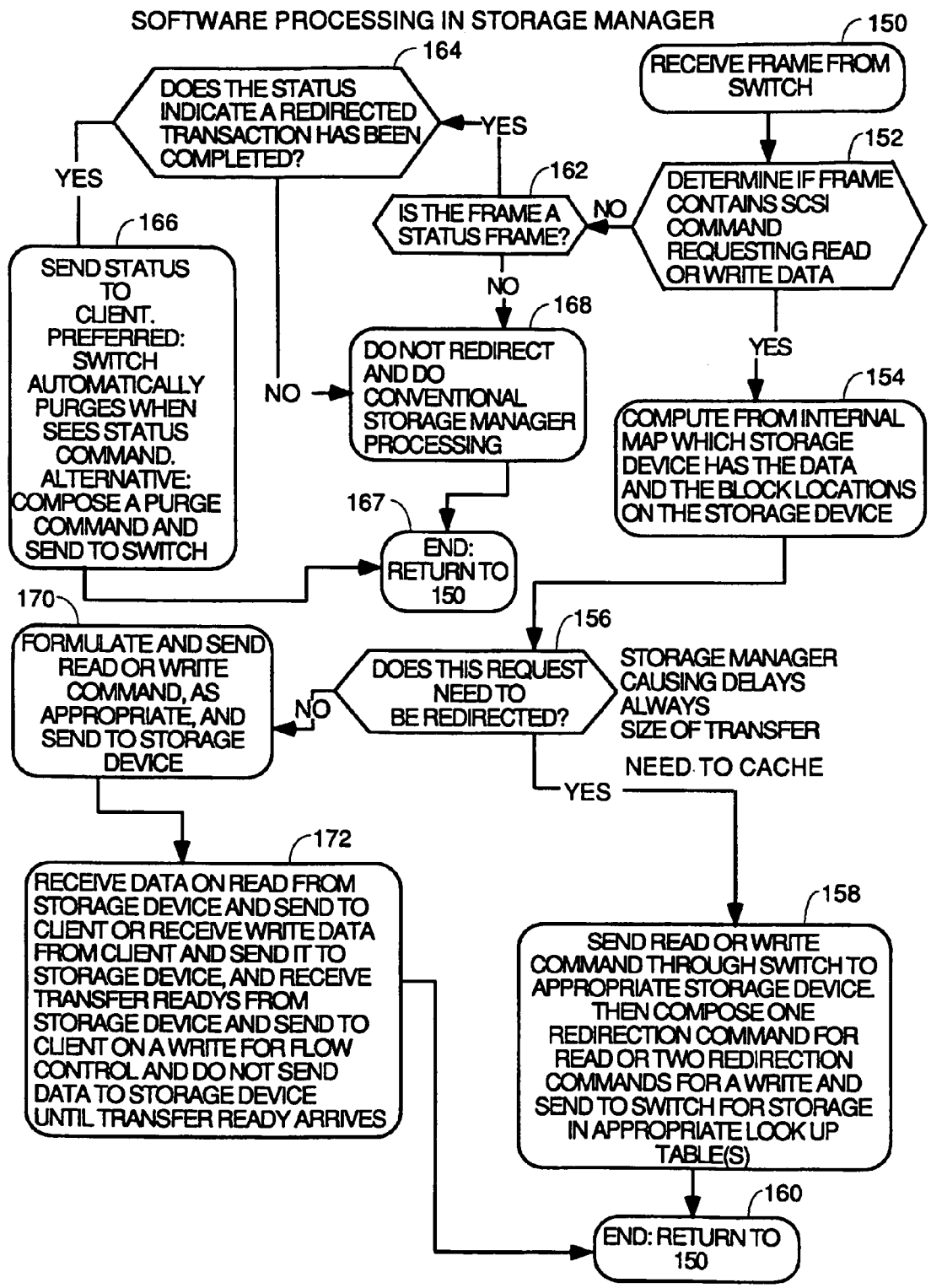
FIG. 13 is a flowchart of another embodiment for the processing in the storage manager to redirect frames.

Referring to FIG. 12, there is shown a block diagram of the pertinent hardware and software modules of a typical storage manager that can implement the teachings of the invention. Basically, a programmed microprocessor, gate array, field programmable gate array or ASIC can be structured to perform the conventional and redirection functionality of the storage manager so long as the circuitry chosen can handle the bandwidth involved. In FIG. 12, a programmed CPU 134 has been chosen to represent all these possibilities but in the claims, all these possible structures are referred to as a "computer programmed to or circuitry structured to make the decision to redirect . . . ." The CPU is programmed with software 135 that carries out conventional storage manager processing as well as the redirection processing. Basically, these conventional and redirection applications interact with the storage manager operating system to carry out the redirection processing and other conventional processing symbolized by FIGS. 10 and 13. The CPU is coupled to a input/output bus 136 for communication with a memory 138 and one or more port adapters of which port adapter 140 is typical. In some embodiments of the storage manager, a cache memory 137 is used and a cache algorithm 139 controls the computer 134 to manage the cache conventionally and to cooperate with the redirection process in the manner described elsewhere herein. The function of the port adapter 140 is to implement the physical layer protocol and any other protocols necessary to communicate with the switch 14. The type port adapter depends upon the type of fabric or packet switch to which the storage manager is coupled. Thus, the port adapter may be a Fibre Channel port adapter or an Ethernet port adapter or an ATM port adapter, etc.

The storage manager 20 must be coupled to switch 14 by at least one physical data path 22 and at least one port adapter 140. However, it is inadvisable to funnel all client device and storage device traffic in large systems through one port since then the port adapter can become a bottleneck. Thus, in larger systems, the storage manager is coupled to the switch via multiple port adapters such as 142 and 144. Typically, all client device traffic will be routed through one port adapter and all storage device traffic will be routed through another port adapter. The redirection and purge commands can be sent to the switch via the port adapters 140, 142 using extended link services frames etc., but since this is very low volume traffic, it is a waste of bandwidth to put one or two redirection commands in a Fibre Channel frame or some packet designed to carry much more data than the redirection command(s) have. In more efficient embodiments, a separate Ethernet or other management link between the storage manager and switch carry overhead information such as redirection and purge commands, SNMP management traffic etc. This separate management link is shown as a port adapter 146, but it can take the form of a physically separate data path or a subchannel on the Fibre Channel or other packet network data paths 22 or 24. Subchannel technology for management traffic is known. One such technology is taught in Ericcson patent U.S. Pat. No. 4,677,608, and another such technology is taught in U.S. patent application entitled SUBCHANNEL MODULATION SCHEME FOR CARRYING MANAGEMENT AND CONTROL DATA OUTSIDE THE REGULAR DATA CHANNEL, filed Apr. 20, 1998, Ser. No. 09/063,633, both of which are hereby incorporated by reference.

All the circuitry of the storage manager is conventional. The only difference is that it is programmed to carry out the redirection and purging processes described herein.

Typically, the frames arriving from the switch are stored in memory 138 and the software process 135 is interrupted. Processing then proceeds according to the flow diagram of FIG. 13 which is an alternative embodiment for storage manager processing or according to FIG. 10. Considering FIG. 13, step 150 represents the process of receiving a frame from the client device via the switch. Test 152 determines if the frame contains a SCSI command requesting reading or writing of specified data. Step 154 uses an internal map to determine from the specification of the data to be read which storage device has the data and the block locations on the storage device where the data is stored. Test 156 determines if the request for data needs to be redirected based upon predetermined redirection criteria which could be a single criteria or any one or a combination of a plurality of different criteria and which can be either fixed or programmable. Further, in some embodiments, which particular criteria is used to decide whether to redirect can be fixed or configurable. In some embodiments, this test 156 is eliminated because all read requests are redirected. In other embodiments, test 156 is present and makes the decision based upon a fixed or configurable redirection criteria. Such criteria include: all requests are redirected; only requests for large amounts of data are redirected; a determination of whether the requested data is already cached or not and not redirecting if the data is already stored in cache of the storage manager; or redirecting only when traffic levels are so high that the storage manager is causing excessive either actually measure delays or just traffic levels are so high that excessive delays are assumed.

If test 156 determines that the data and transfer ready frames of the transaction need to be redirected, block 158 the storage manager sends an appropriate read or write command through the switch to the appropriate storage device to start the transaction. As detailed above, the storage manager assigns an originator exchange ID for this manager-device transaction. Then, if the transaction is a read, the storage manager composes a single "second redirection command" in the manner detailed above and sends it to the switch. If the transaction is a write, the storage manager composes both first and second redirection commands in the manner described above and sends them both to the switch. Block 150 represents a return to block 150 to await the next frame.

Returning to test 152, if it is determines that the incoming frame is not a read or write request, test 162 is performed to determine if the frame is a status frame. If it is, test 164 determines whether the status frame indicates that a transaction which has been redirected has been completed. If it does, the processing of block 166 is performed in all embodiments to send a status frame to the client which requested the transaction which has been completed. In the preferred embodiment represented by block 166, the storage manager does not have to compose a purge command because the switch automatically purged redirection commands rendered obsolete by the status frame. In an alternative embodiment, also represented by block 166, the switch does not automatically purge, and the storage manager composes one or more purge commands when it sees the status frames and sends them to the switch. Then step 167 is performed to return to step 150.

Returning to step 162, if the frame is not a status frame, conventional storage manager processing of the frame is completed, per block 168.

Returning to step 156, if it is determined from whatever redirection criteria is in use that the requested read or write transaction does not need to be redirected, processing of step 170 is performed. This processing only formulates and sends an appropriate read or write command to the storage device. Then the procesing of step 172 is performed wherein the read data is received from the storage device and forwarded to the client. If the transaction is a write, the write data is received from the client and sent to the storage device, and transfer ready frames are received from the storage device and sent to the client for flow control purposes. The storage manager also uses the transfer ready frames to make sure it does not overflow the storage device buffer. The step 160 returns control to step 150.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A switch for a packet switched or frame switched network, said switch having conventional routing circuitry, said network having client devices and storage devices and a storage manager that decides to redirect read and/or write transactions on any basis so as to virtualize said storage devices, said switch comprising:

one or more ports which are configured to receive at least one redirection command from said storage manager containing old address data and new address data, wherein said ports store said old address data and new address data in one or more look up tables, and wherein if a packet or frame is of a type to be relabeled and redirected, relabelling said packet or frame by substituting the corresponding new address data in said packet or frame header, and passing said relabeled packet or frame to said conventional routing circuitry.

2. The apparatus of claim 1, wherein said one or more port contains its own redirection circuitry and its own look up table for storing redirection commands, said redirection circuitry in said one or more port being structured to receive first and second redirection commands for every write transaction to be redirected and to use configuration data defining which switch ports are coupled to which devices, and said configuration data being used to forward said first redirection command to a first port of said switch which originated a write request for storage in a look up table, and to forward the second redirection command to a second port which is to store data to be written for storage in a look up table, said redirection circuitry being configured to forward said first or second redirection command to a third port coupled to the storage device for storage in a look up table.

3. The apparatus of claim 1, wherein each said port contains its own redirection circuitry and its own look up table for storing redirection commands, said redirection circuitry in every port being structured to receive first and second redirection commands for every write transaction to be redirected and to forward said first and second redirection commands to all ports of said switch for storage in the look up tables of said ports, said redirection circuitry also being configured to receive a redirection command for every read transaction to be redirected and to forward said redirection command to all ports of said switch for storage in a look up table in said third port.

4. The apparatus of claim 1, wherein each said port contains its own redirection circuitry, said redirection circuitry in every port being structured to receive a first and second redirection commands for every write transaction to be redirected and to forward said first and second redirection commands to a shared look up table in said switch to which all redirection circuits in all ports have access, said redirection circuitry also being structured to receive a redirection command for every read transaction to be redirected and to forward said redirection command for storage in said shared look up table.

5. The apparatus of claim 1, wherein said switch contains shared redirection circuitry that performs the redirection process and a shared look up table for storing redirection command used by said shared redirection circuitry to perform said redirection process, and wherein each said port contains circuitry to forward frames or packets to said shared redirection circuitry for analysis and relabelling if said frames or packets are to be redirected.

6. A virtualizing storage manager for a packet switched or frame switched network, said network having client devices and storage devices and a switch having any structure capable of redirecting read and/or write transactions based upon commands from said storage manager so as to virtualize said storage devices, said storage manager comprising:

a module configured to redirect packets or frames of a read or write transaction based upon redirection criterion, and configured to send at least one redirection command to a switch in said network, and configured to send a corresponding read or write request to the appropriate storage device for every received read or write request and to send at least one purge command to a switch in said network which stored said redirection commands, wherein said at least one purge command causes said switch to purge the redirection command or commands pertaining to said one or more read or write transaction that has been completed.

7. The apparatus of claim 6, wherein said redirection criteria is programmable redirection criteria.

8. The apparatus of claim 6, wherein a storage manager makes a decision whether to redirect data and transfer ready packets or frames of a particular read or write request based upon redirection criteria.

9. The apparatus of claim 6, wherein a storage manager redirects data and transfer ready packets or frames of a particular read or write request when a number of outstanding read and/or write requests is greater than or equal to a threshold.

10. The apparatus of claim 9, wherein said threshold is programmable.

11. The apparatus of claim 6, wherein a storage manager redirects data and transfer ready packets or frames when the number of outstanding read and/or write requests is such that a measured latency between receipt of a read or write request and completion of the corresponding read or write transaction is greater than a threshold latency.

12. The apparatus of claim 6, wherein a storage manager makes a decision whether or not to redirect data and transfer ready packets or frames of a particular read or write request based upon redirection criteria, wherein the redirection criteria is that every packet or frame of a data or transfer ready type which is part of a read or write transaction is to be redirected when said storage manager decides that it has become a bottleneck.

13. The apparatus of claim 6, wherein a storage manager redirects data and transfer ready packets or frames of a particular read or write request when a read or write transaction corresponding to said request has been completed exceeds a predetermined threshold.

14. The apparatus of claim 13, wherein said predetermined threshold is a number read from a look up table which stores threshold values based upon the size of the tread or write transaction, and wherein said means for deciding performs the following steps:
   (1) analyzing each read or write request to determine the size of the transaction and retrieves the appropriate latency threshold value from said look up table based upon the size of the read or write transaction;
   (2) starting a counter when said read or write request was received;
   (3) perform conventional read or write transaction processing including sending a read or write command to the appropriate storage device and including forwarding data and transfer ready frames to the client or storage device as appropriate to the particular type of transaction being performed;
   (4) stop said counter when said conventional read or write transaction was completed;
   (5) comparing the counter value when the transaction was completed to the threshold number as a measure of the time it took to complete the conventional read or write transaction; and
   (6) if the time taken to complete the conventional read or write transaction exceeded the threshold, generating one or more redirection commands for subsequent read or write requests and sending them to the switch;
   (7) performing any method of stopping redirection after some time passes and resuming the latency measuring process of steps (1) through (6) for subsequent read or write requests until a latency threshold value is again exceeded, and then repeating steps (6) and (7).

15. The apparatus of claim 14, wherein step (7) comprises continuing redirection for a predetermined amount of time, and then ceasing redirection and resuming performance of steps (1) through (6) for subsequent read or write requests until a latency threshold value is again exceeded, and then repeating steps (6) and (7).

16. The apparatus of claim 14, wherein step (7) comprises continuing redirection for all subsequent read or write requests except every Xth read or write request where X is any integer and carrying out conventional read or write transaction processing as appropriate for every Xth read or write request and measuring the latency of said Xth request by performance of steps (1) through (6), and if the latency threshold has not been exceeded by said Xth request, resuming performance of steps (1) through (6) for subsequent read or write requests until a latency threshold value is again exceeded, and then repeating steps (6) and (7).

17. The apparatus of claim 6, wherein said storage manager redirects data and transfer ready packets or frames of a particular read or write request when a packet or frame of a data or transfer ready type which is part of a read or write transaction exceeds a certain size.

18. The apparatus of claim 6, wherein said storage manager includes a cache memory and a cache algorithm that manages said cache memory, and wherein said storage manager makes a decision to redirect data and transfer ready packets or frames of a particular read or write request if the requested data is already stored in said cache memory in said storage manager, or makes a decision to redirect a read transaction if said storage manager cache algorithm wants to copy the data of the read request into said cache memory in said storage manager.

19. The apparatus of claim 1, wherein each port of said switch is structured to receive redirection commands and store all said redirection commands in a look up table maintained by said port and use said look up table to do all necessary relabelling and redirection operations.

20. A packet switched or frame switched network, comprising:
   one or more client devices;
   one or more storage devices;
   a storage manager having circuitry configured to receive read or write transaction requests and redirect at least some of said read and write transaction requests by issuing redirection commands which will cause relabeling of data and transfer ready frames so that they are routed between said client device which issued said request and the storage device so as to bypass said storage manager, wherein said redirection circuitry is configured to receive status packets or frames and issuing purge commands which function to cause purging of old address and new address data of redirected read or write transactions that have been completed;
   one or more switches, each of the switches further comprising:
   a shared lookup table; and
   a shared redirection interface circuit,
   wherein said shared redirection circuitry configured to determine if the packet or frame is of a type which is to be relabeled and redirected, and, if the packet or frame is of a type to be relabeled and redirected, substituting the corresponding new address data from said look up table, and forwarding said packet or frame to routing circuitry.

21. A packet switched or frame switched network, comprising:
   one or more client devices;
   one or more storage devices;
   a storage manager having redirection circuitry configured to receive transaction requests from said one or more client devices and redirect at least some of said transaction requests issued by said client devices by issuing redirection commands which will cause relabeling of data and transfer ready frames so that they are routed between said client device to a storage device so as to bypass said storage manager, wherein said redirection circuitry is also configured for sending a corresponding request to a storage device for every received request from a client device to start the transaction, said redirection circuitry also configured to receive status packets or frames indicating particular transactions that have been redirected have been completed and for issuing purge commands which function to cause purging of old address and new address data of redirected transactions that have been completed;
   one or more switches having routing circuitry and further comprising at least one port,
   and wherein the at least one port is configured to receive one or more redirection commands containing old address data and new address data and store said old address data and new address data to purge old and new address data pertaining to redirected transactions that have been completed, wherein each said switch contains redirection circuitry configured to determine if the packet or frame is of a type which is to be relabelled and redirected, and, if the packet or frame is of a type to be relabelled and redirected, then comparing the old address data therein to the old address data and if there is a match to any of the old address data entries, substituting the corresponding new address data for said old address data in said packet or frame header and passing said packet or frame to said routing circuitry for forwarding to the destination identified in said new address data.

22. The apparatus of claim 20, wherein said redirection circuitry in said storage manager includes means to decide which transactions to redirect based upon predetermined redirection criteria.

23. The apparatus of claim 21, further comprising a look up table in each port and wherein said redirection circuitry comprises a redirection circuit in every port.

24. The apparatus of claim 21, wherein said one or more look up tables comprise a look up table in each port and wherein said redirection circuitry comprises a redirection circuit in every port, and wherein said redirection circuitry in said storage manager includes means to decide which read and/or write transactions to redirect based upon predetermined redirection criteria which could be any one of a plurality of different criteria, said criteria being either fixed or programmable, and which particular criteria is used can be fixed or configurable.

25. A switch for a packet or frame switched network including one or more client devices and one or more storage devices and a storage manager server, said switch comprising:
means for sending a corresponding request to the appropriate storage device identified in the original destination address information for every received request received from a client device to start a transaction, and for readdressing selected frames or packets which match any stored redirection command to the device identified in the destination address of the original frame or packet header information, and sending said selected packets or frames to a destination address identified in the new header data and purging old address data and new address data identified in said purge commands of redirection commands issued for transactions that have been completed.

26. A storage manager for a packet or frame switched network including one or more client devices and one or more storage devices and a switch, said storage manager comprising:
means for receiving transaction requests from said one or more client devices and mapping the destination address data designated in each said transaction request to a storage device, and, for each said transaction request, sending a corresponding request to said storage device identified in said destination address to start a transaction; and
means for using redirection criteria to decide which requests from said client devices to redirect, and for sending redirection commands to said switch for the requests to be redirected, and to have the header information thereof altered so that they are routed by said switch to bypass said storage manager; and
means for receiving status frames or packets and for issuing purge commands to said switch when said status frames or packets indicate a read or write transaction which has been redirected has been completed, said purge commands for causing said switch to purge old address data and new address data identified in said purge commands of redirection commands previously issued for transactions that have been completed.

27. A packet or frame switched network including one or more client devices and one or more storage devices each of which is coupled to a packet or frame switch comprising:
a switch comprising:
one or more ports in said switch, redirection circuitry configured to store the redirection address data containing old address data and new address data contained therein in a look up table, said redirection circuitry also structured to determine if incoming packets or frames are data or transfer ready type frames or packets and, if so, to substitute the new address data from the entry which includes old address data that matched the address data in the incoming packet or frame and pass the packet or frame to routing circuitry; and
a storage manager comprising one or more port adapter circuits, configured to receive requests from said one or more client devices and if the transaction is larger than a redirection size criteria, sending one or more redirection commands to said switch for storage in at least one look up table maintained therein, and to purge the old and new address data from said look up table for transactions that have been completed.

28. The apparatus of claim 27, wherein each said port maintains its own redirection circuitry and its own look up table storing redirection commands, and wherein said microprocessor in said storage manager server looks up the specific port to which a specific storage device involved in a transaction is coupled and/or the specific port to which the client device involved in a specific transaction is coupled and sends said one or more redirection commands for the transaction only to the appropriate specific port.

29. The apparatus of claim 27, wherein each said port maintains its own look up table storing redirection commands, and wherein said storage manager server sends all said redirection commands to all ports in said switch and wherein each port includes redirection circuitry to store redirection commands in the port's look up table and use the data therein to relabel for redirection data and transfer ready frames.

30. The apparatus of claim 27, wherein said switch maintains a shared look up table storing all redirection commands received from said storage manager, said shared look up table for use by all ports, and wherein said storage manager sends all said redirection commands to a port to which said storage manager server is coupled with instructions to forward said redirection command for storage in said shared look up table, and wherein each said port of said switch has circuitry to use said shared look up table to determine if an incoming frame or packet needs to be relabelled for redirection.

31. The apparatus of claim 27, wherein said storage manager server is configured to sum the number of outstanding read requests that have not yet been fulfilled, and only issues redirection commands when the number of outstanding read requests exceeds a threshold and said number is greater than said redirection size criteria.

32. The apparatus of claim 27, wherein said microprocessor in said storage manager server is programmed to monitor the time between receipt of a read or write request and completion thereof, and only issues redirection commands when the time to fulfillment exceeds a threshold and a size of said transaction is greater than said redirection size criteria.

33. A packet or frame switched network including one or more client devices and one or more storage devices, each of which is coupled to a packet or frame switch, comprising:
- a switch having routing circuitry therein and further comprising:
- shared redirection circuitry;
- a shared look up table;
- one or more ports in said switch which are configured to receive relabelling, redirection and purge commands and to forward them to said shared redirection circuitry for storage in said shared look up table and structured to forward data and transfer ready frames to said shared redirection circuitry; and
- a storage manager including cache memory and circuitry configured to receive requests from said one or more client devices and to redirect a particular request based upon redirection criteria and if said request is to be redirected, sending one or more redirection commands to said switch for storage in said shared look up table wherein said redirection command will relabel said packet or frame with new address data and forward said packet or frame to said routing circuitry such that said packet or frame gets routed so as to bypass said storage manager, and sending purge commands to said switch to purge the old and new address data from said shared look up table for read and write transactions that have been completed.

34. A packet or frame switched network including one or more client devices and one or more storage devices, comprising:
- a data path coupled to said client devices and said storage devices;
- a storage manager coupled to said data path;
- a switch having routing circuitry and including:
- redirection circuitry configured to receive relabelling and redirection commands from the storage manager and to store the redirection address data containing old address data and new address data contained therein in at least one look up table and to receive incoming data and transfer ready packets or frames and and, if there is a match to any of the old address data in said look up table and the type information matches the types of packets or frames that are to be redirected, substituting at least the new address data from said look up table from the entry and pass the packet or frame to said conventional routing circuitry and performing conventional processing to route all other packets or frames to said conventional routing circuitry; and
- wherein said storage manager includes:
- means for receiving requests from any of said one or more client devices identifying specific data, and if said transaction is to be redirected, analyzing said requests to determine how many blocks of data are to be read or written, and, if the number of blocks is greater than a threshold, mapping the requested blocks to a storage device which stores the requested data and sending one or more redirection commands to said switch for storage in said at least one look up table maintained therein, said redirection commands causes said packet or frame to be routed by said conventional routing circuitry so as to bypass said storage manager and sending purge commands to said switch to purge the old and new address data from said at least one look up table for transactions that have been completed.

35. A process of redirecting selected types of data frames or packets which are part of a read transaction between a client computer and a storage device in a packet or frame switched network including a storage manager, one or more client computers, one or more storage devices and a packet or frame switch, comprising the steps:
1) receiving at said storage manager from a client computer one or more read requests;
2) receiving at said packet or frame switch from said storage manager at least one redirection command to redirect selected types of data frames or packets which are part of a read transaction to be redirected and storing said redirection commands;
3) responding to said read requests at said one or more storage devices which received said one or more read requests by transmitting frames or packets addressed to said storage manager via said switch, said frames or packets containing the requested data; and
4) changing the header of the frames or packets of said packets or frames to be redirected so as to reroute them through said switch to one or more client devices so as to bypass said storage manager and relabelling the headers of said frames or packets to be rerouted.

36. A process of redirecting selected frames or packets which are part of read transaction between a client device which is requesting data and which transmitted a read request to a storage manager via a packet or frame switch requesting data from a storage device which stores the requested data, said client and storage device and storage manager and switch all being in a packet or frame switched network, said process carried out in said switch and comprising the steps:
- receiving one or more redirection commands to redirect the data frames or packets and storing said one or more redirection commands; and
- receiving frames or packets and, if said receive frames or should be redirected, changing the header of each of the received frames or packets so as to reroute said particular types of frames or packets so as to bypass said storage manager and relabelling the headers thereof.

37. A process for controlling redirection of selected data frames or packets of selected types which are part of a read transaction between a client device and a storage device in a packet or frame switched network wherein said client device initiates said read transaction to be redirected by transmitting a read request to a storage manager via a switch requesting data from a particular storage device, said process carried out in said storage manager and comprising the steps:
- receiving at said storage manager one or more read requests; composing and transmitting to said packet or frame switch redirection commands to redirect selected types of data frames or packets such that said switch rewrites header information in selected types of data frames and packets, said header information being rewritten such that said selected types of data frames and packets are routed through said switch but said rewriting of said header.

38. A process of redirecting data frames or packets in a packet or frame switched network, said process carried out in a switch and comprising the steps:
- receiving from a storage manager at a packet or frame switch redirection commands to redirect the data frames or packets which are responses to at least one read requests originated by a client device; and
- intercepting frames or packets of read data responding to said at least one read requests, and, if a redirection command is stored for a read transaction, changing the header of the frames or packets of said particular read transaction which contain the requested read data so as to reroute them through said switch so as to bypass said storage manager and relabelling the headers thereof such that the rerouted packets or frames have the Port_ID of the client that made the read request as the destination address and the Port_ID of the storage device as the source address and have the originator exchange ID originally assigned by said client.

39. A process of redirecting data frames or packets in a packet or frame switched network comprising the steps:

receiving a write request;

receiving at least two redirection commands to redirect the data and transfer ready frames or packets of said write request and storing said redirection commands; and intercepting transfer ready frames or packets of data responding to write request, and, if a redirection command is stored for a write transaction which said transfer ready frames or packets are a part of, changing the header of the transfer ready frames or packets of said write transaction to be redirected and routing transfer ready frames or packets so as to reroute them through said switch;

receiving one or more frames or packets of write data and changing the header of the write data frames or packets of said write transaction to be redirected and routing said write data frames or packets so as to bypass said storage manager; and continuing the process of re-routing said transfer ready and write data frames until the entire write transaction is completed.

40. A process of redirecting data frames or packets in a packet or frame switched network, said process carried out in a switch and comprising the steps:

receiving at least one redirection command to redirect the data and transfer ready frames or packets originated by a client device and storing said redirection commands; and intercepting write data and transfer ready frames or packets and, changing the header of the write data and transfer ready frames or packets so as to reroute them through said switch so as to bypass said storage manager to have the originator exchange ID originally assigned by said client to the write transaction; and transmitting said write data and transfer ready frames or packets to said client or a storage device.

41. A system comprising:

at least one data paths;

at least one client devices coupled to said data path;

at least one storage devices coupled to said data path;

one or more switch means coupled said data path receiving redirection commands and storing the redirection commands and for using information in said redirection commands to rewrite headers in said packets or frames to be redirected so as to cause said packets or frames to be rerouted to pass between a client device and a storage device bypassing a storage manager and for using the data in said purge command to purge from said one or more lookup tables redirection commands for read and/or write transactions that have been completed; and storage manager means for receiving requests from said one or more client devices and for determining whether to redirect predetermined type of packets or frames in transactions, and if a transaction initiated by a request is to be redirected, sending to said switch means said one or more redirection commands to cause predetermined types of packets or frames of said transactions to be redirected so as to bypass said storage manager means and sending said purge commands to said switch means to cause it to purge the redirection commands of completed transactions.

42. A switch for a packet switched or frame switched network, said switch having conventional routing circuitry, said network having client devices and storage devices and a storage manager that decides to redirect read and/or write transactions on any basis so as to virtualize said storage devices, said switch comprising:

one or more ports configured to receive one or more redirection commands containing old address data and new address data, and storing said one or more redirection commands said switch containing circuitry configured to determine if the packet or frame is of a type which is to be relabelled and redirected, and, if the packet or frame is of a type to be relabelled and redirected, relabelling said packet or frame by substituting the corresponding new address data from said matching redirection command in said packet or frame header causing said relabelled packet or frame to be routed so as to bypass said storage manager and then forwarding the relabeled packet or frame to the destination identified in said new address data.

* * * * *